United States Patent [19]
Mizutani et al.

[11] Patent Number: 5,993,909
[45] Date of Patent: Nov. 30, 1999

[54] THERMOSETTING COMPOSITIONS, METHODS OF COATING AND COATED ARTICLES

[75] Inventors: Hiroki Mizutani, Chigasaki; Yoshinori Nakane, Naka-gun; Masahiro Ishidoya, Chigasaki, all of Japan

[73] Assignee: NOF Corporation, Tokyo, Japan

[21] Appl. No.: 08/776,974

[22] PCT Filed: Jun. 5, 1996

[86] PCT No.: PCT/JP96/01522

§ 371 Date: Apr. 21, 1997

§ 102(e) Date: Apr. 21, 1997

[87] PCT Pub. No.: WO96/39454

PCT Pub. Date: Dec. 12, 1996

[30] Foreign Application Priority Data

Jun. 6, 1995 [JP] Japan ................................. 7-161522

[51] Int. Cl.⁶ ........................................ B05D 3/02
[52] U.S. Cl. ..................... 427/379; 427/386; 427/410; 525/27; 525/63; 525/176; 525/386
[58] Field of Search ................. 525/11, 27, 63, 525/65, 170, 177, 386, 445; 528/272, 297; 427/379, 386, 410

[56] References Cited

U.S. PATENT DOCUMENTS

| | | |
|---|---|---|
| 3,505,297 | 4/1970 | Sheetz et al. . |
| 4,371,667 | 2/1983 | Möller et al. . |
| 4,650,718 | 3/1987 | Simpson et al. . |
| 4,681,811 | 7/1987 | Simpson et al. . |
| 4,703,101 | 10/1987 | Singer et al. . |
| 4,764,430 | 8/1988 | Blackburn et al. . |
| 5,352,740 | 10/1994 | Ishidoya et al. ............ 525/119 |
| 5,661,219 | 8/1997 | Nakane et al. . |

FOREIGN PATENT DOCUMENTS

| | | |
|---|---|---|
| 029 595 | 6/1981 | European Pat. Off. . |
| 55-137169 | 10/1980 | Japan . |
| 4-218561 | 8/1992 | Japan . |
| 5-43653 | 2/1993 | Japan . |
| 7-26125 | 1/1995 | Japan . |

OTHER PUBLICATIONS

Derwent English language Abstract of JP 2–115238 (Apr. 1990).

Derwent English language Abstract of JP 1–104646. (Apr. 1989).

Derwent English language Abstract of JP 60–88038. (May 1985).

Derwent English language Abstract of JP 51–114429. (Jan. 1976).

*Primary Examiner*—Robert Dawson
*Assistant Examiner*—D. Aylward
*Attorney, Agent, or Firm*—Frishauf, Holtz, Goodman, Langer & Chick, P.C.

[57] ABSTRACT

A thermosetting composition which comprises (A) an epoxy group-containing modified polyester polymer comprising a structural moiety of (a) a carboxyl group-containing polyester resin having a number average molecular weight of 1,500 to 50,000 and a resin acid value of 2 to 30 mgKOH/g and a structural moiety of a polymer of (b) an epoxy group-containing vinyl monomer, the carboxyl groups and a part of the epoxy groups being bonded in an equivalent ratio of the carboxyl groups in the component (a) to the epoxy groups in the polymer of the component (b) of 0.1 or less, and having an epoxy equivalent weight of 200 to 2,000 g/mol, and (B) a compound having two or more functional groups which are blocked by a vinyl ether, vinyl thioether or heterocyclic group carrying oxygen or sulfur as the heteroatom and having a double bond of the vinyl type. The composition can give cured articles excellent in hardness, chemical resistance, stain resistance, processability, impact resistance, elasticity and weathering resistance and has a good storage stability.

28 Claims, No Drawings

THERMOSETTING COMPOSITIONS, METHODS OF COATING AND COATED ARTICLES

FIELD OF TECHNOLOGY

The present invention relates to a novel thermosetting composition comprising an epoxy group-containing modified polyester polymer and a blocked carboxyl group-containing compound, or comprising a thermal latent acid catalyst in combination with them, a method of coating which uses it as a top coating composition capable of giving excellent film properties and appearance and a coated article. The thermosetting composition is easy to prepare one component liquid of high solid content and gives excellent appearance in coating. Further, the thermosetting composition features excellent hardness, chemical resistance and stain resistance originated from a polymer of a vinyl monomer, and processability and impact resistance originated from a polyester resin, and further excellent elasticity. The present invention can be preferably used in the field of coatings, ink, adhesives and molded articles.

BACKGROUND TECHNOLOGY

It is generally known that thermosetting compositions are prepared from compounds having carboxyl groups and compounds having reactive functional groups which can form chemical bonds with the carboxyl groups by heating, such as epoxy group, oxazoline group, silanol group, alkoxy silane group, amino group, imino group, isocyanate group, blocked isocyanate group, cyclocarobonate group, vinyl ether group, vinyl thioether group, aminomethylol group, alkylated aminomethylol group, acetal group and ketal group.

As the thermosetting compositions described above, for example, compositions comprising combination of carboxyl groups and epoxy groups have been disclosed in Laid Open Japanese Patent Application Showa 51-114429, Laid Open European Patent Application 29595 and U.S. Pat. Nos. 4,371,667, 4,650,718, 4,681,811, 4,703,101 and 4,764,430.

The compositions comprising combination of carboxyl groups and oxazoline groups have been disclosed in U.S. Pat. No. 3,505,297 and Laid Open Japanese Patent Applications Showa 60-88038 and Heisei 2-115238.

The thermosetting compositions give cured products having excellent chemical properties, physical properties and weathering resistance and are widely utilized in the field of coatings, ink, adhesives and molded articles.

However, the reactivity between the carboxyl group and the reactive functional groups is high so that compositions in which compounds having carboxyl groups and compounds having the reactive functional groups exist together have problems that the compositions are gelled during storage and the period suitable for pot life is short.

The compounds comprising carboxyl groups conventionally utilized for thermosetting compositions described above have problems that solubility to generally used organic solvents is low and that compatibility to the compounds having reactive groups, which react with the carboxyl group, is inferior because of the property of the carboxyl group capable of forming strong hydrogen bonds. When the thermosetting compositions are utilized as top coating compositions, there are naturally have problems that preparation of coating composition of high solid content is difficult and that appearance of the finished coat is inferior.

For the purpose of solving these problems, it was proposed that carboxyl group was blocked by converting it to tertiary-butyl ester and the ester was decomposed by heating, and the free carboxyl group was regenerated by elimination of isobutene (Laid Open Japanese Patent Application Heisei 1-104646).

However, there were problems that this method required a high temperature, such as 170–200° C., for the heat decomposition of the tertiary-butyl ester and that pock marks which were made by foaming and degassing of isobutene formed by the decomposition remained on the cured surface of the coating. Thus, this method is not sufficiently satisfactory.

The inventors have already suggested a thermosetting composition comprising a compound having functional groups in which carboxyl groups are blocked with vinyl ethers, and a compound having reactive functional groups which react the functional groups (Laid Open European Patent Application 643112) in order to solve the problems described above. But, a thermosetting composition which gives more excellent paint film having impact resistance, processability and elasticity is needed in some uses.

On the other hand, a polymer of a vinyl monomer such as a (meth) acrylic ester polymer and a styrene polymer, and a polyester resin are nowadays mainly utilized as a polymer of a main material in the thermosetting composition utilized in the field of coatings.

The polymer of the vinyl monomer is generally excellent in hardness, chemical resistance such as alkali resistance and acid resistance, stain resistance to carbon powder, transparency and gloss. Therefore, the polymer of the vinyl monomer is broadly used as polymers for main materials of coating compositions. But, the polymer has defects of brittleness, poor processability and weak impact strength though the polymer has high hardness.

The polyester resin is widely used as polymers for main materials of coating compositions because the polyester resin generally has elasticity and is excellent in processability and transparency. But, the polyester resin has defects that chemical resistance such as acid resistance and stain resistance to various stain substances such as carbon powder, oil ink, rain and foods are inferior.

As the means for overcoming the both defects and making use of both characteristics, it is thought to blend the polymer of vinyl monomer and the polyester resin. But, they have defects that phase separation is caused and that required hardness, chemical resistance and processability are not obtained and simultaneously transparency of the composition is impaired, because the polymer of vinyl monomer and the polyester resin having high molecular weight are poor in compatibility each other.

The present invention has an object to solve the defects relating to storage stability, appearance during coating and preparation of high solid content coating composition, which exist in the conventional thermosetting composition comprising the conventional carboxyl group-containing compound and the compound having reactive functional group which can form chemical bonds with the carboxyl group. The present invention also has an object to provide thermosetting compositions which can give cured products having excellent hardness, chemical resistance and stain resistance originated from the polymer of vinyl monomer, and processability and impact resistance originated from the polyester resin, and further excellent elasticity and can be preferably utilized in the field of, for example, coatings, ink, adhesives and molded articles. Other objects of the invention are to provide methods of coating which use the thermosetting compositions as top coating compositions and can give a paint film having film properties described above and excellent appearance to the finished articles, and to provide coated articles.

Extensive investigations were undertaken by the present inventors in order to develop the thermosetting compositions having the preferable properties described above lead to discoveries that it is preferable to utilize (A) an epoxy group-containing modified polyester polymer produced by a specific process for preparation as the main material and the objects can be achieved by a composition comprising, essentially the polymer (A) and (B) a compound having in the molecule two or more carboxyl groups which are blocked by a specific vinyl ether group, vinyl thioether group or heterocyclic group having vinyl type double bond and oxygen or sulfur as the hetero atom component, and optionally (C) a thermal latent acid catalyst and/or (D) a dispersing component of at least one inorganic oxide sol selected from the group consisting of aluminum oxide sol, silica sol, zirconium oxide sol and antimony oxide sol. The present invention was completed on the basis of the discoveries described above.

DISCLOSURE OF THE INVENTION

Thus, the present invention provides a thermosetting composition which comprises (A) an epoxy group-containing modified polyester polymer comprising a structural moiety of (a) a carboxyl group-containing polyester resin having a number average molecular weight of 1,500 to 50,000 and a resin acid value of 2 to 30 mgKOH/g and a structural moiety of a polymer of (b) an epoxy group-containing vinyl monomer, the carboxyl groups and a part of the epoxy groups being bonded in an equivalent ratio of the carboxyl groups in the component (a) to the epoxy groups in the polymer of the component (b) of 0.1 or less, and having an epoxy equivalent weight of 200 to 2,000 g/mol, and (B) a compound having two or more functional groups of formula (1) per molecule

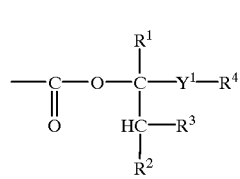

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component.

The present invention also provides a thermosetting composition in which an epoxy group-containing modified polyester polymer having an epoxy equivalent weight of 200 to 2,000 g/mol prepared by polymerizing (b) an epoxy group-containing vinyl monomer in the presence of (a) a carboxyl group-containing polyester resin having a number average molecular weight of 1,500 to 50,000 and a solvent in an equivalent ratio of the carboxyl group of the component (a) to the epoxy groups of the component (b) of 0.1 or less with a radical polymerization initiator is used instead of the polymer (A).

Further, the present invention provides a thermosetting composition which comprises (C) a thermal latent acid catalyst, which is activated during curing of the composition, and (D) a dispersing component of at least one inorganic oxide sol selected from the group consisting of aluminum oxide sol, silica sol, zirconium oxide sol and antimony oxide sol in the thermosetting composition described above.

Furthermore, the present invention provides a method of coating which comprises coating a substrate with a top coating composition comprising a pigment and the thermosetting composition described above, the amount of the pigment being in the range from 0 to 300 parts by weight based on 100 parts by weight of a total nonvolatile matter of ingredient (A) and the ingredient (B) of the thermosetting composition.

The present invention provides a method of coating which comprises coating a substrate with a composite coating layer by coating the substrate with a colored film-forming composition to form a base coat, followed by coating the base coat with a clear film-forming composition to form a clear top coat, the clear film-forming composition being a top coating composition comprising the thermosetting composition described above.

The present invention provides a method of coating which comprises coating a metal plate with an undercoating composition and curing the under coat layer, and followed coating the metal plate with a top coating composition comprising pigment and the thermosetting composition described above, the amount of the pigment being in the range from 0 to 300 parts by weight of a total nonvolatile matter of ingredient (A) and the ingredient (B) of the thermosetting composition, and then curing the top coat layer by heating.

The present invention provides a method of coating which comprises coating a metal plate with an undercoating composition and curing the undercoat layer, coating the metal plate with an intermediate coating composition and curing the intermediate coat layer, and followed coating the metal plate with a top coating composition comprising pigment and the thermosetting composition described above, the amount of the pigment being in the range from 0 to 300 parts by weight based on 100 parts by weight of a total nonvolatile matter of the ingredient (A) and the ingredient (B) of the thermosetting composition, and then curing the top coat layer by heating.

The present invention provides a coated article applied by the methods of coating described above.

The present invention will be explained in detail in the following.

DETAILED DESCRIPTION OF THE INVENTION

The epoxy group-containing modified polyester polymer of ingredient (A) in the present invention is a composite polymer comprising a polymer of a vinyl monomer and a polyester resin and a chemical bond is formed between a large amount of the corresponding portions of two different polymers. Therefore, ingredient (A) can give both good characteristics of the polymer of the vinyl monomer and the polyester resin without the stronger phase separation each other.

Thus the epoxy group-containing modified polyester polymer substantially comprises the structural moiety of (a) the carboxyl group-containing polyester resin having a number average molecular weight of 1,500 to 50,000 and a resin acid value of 2 to 30 mgKOH/g and the structural moiety of the polymer of (b) an epoxy group-containing vinyl monomer.

The carboxyl group-containing polyester resin of component (a) features containing of carboxylic acid ester bonds in the skeleton of the molecular main chain and is a component which gives flexibility to the epoxy group-containing modified polyester polymer of ingredient (A). The number average molecular weight of the carboxyl group-containing polyester resin of component (a) is 1,500 to 50,000, preferably 1,500 to 25,000, more preferably 1,500 to 20,000. When the number average molecular weight is less than 1,500, the mechanical properties of the obtained polymer is inferior. When the number average molecular weight is more than 50,000, the solubility of the obtained polymer to organic solvents is poorer.

The resin acid value of the carboxyl group-containing polyester resin of component (a) is 2 to 30 mgKOH/g, preferably 2 to 25 mgKOH/g, more preferably 2 to 20 mgKOH/g. When the resin acid value is less than 2 mgKOH/g, the amount of the chemical bonds between the carboxyl groups of component (a) and the polymer of the epoxy group-containing vinyl monomer of component (b) is poor so that the phase separation is easily caused and it is difficult to obtain the stable epoxy group-containing modified polyester polymer. When the resin acid value is more than 30 mgKOH/g, all reaction system are gelled because the amount of the chemical bonds between component (a) and component (b) is extremely increased.

Processes for preparing based on conventional technologies can be applied to the process for preparing component (a). The component (a), for example, can be obtained by polycondensation or addition polymerization reaction of a proper combination of the compounds selected from the group consisting of a carboxyl group-containing compound, an ester thereof with an alcohol, a hydroxyl group containing compound, an acid anhydride, an epoxy group-containing compound and a compound having plural functional groups described above in a molecule as a raw material. The combination of the compounds kind is properly selected within combinations which can obtain the carboxyl group-containing polyester resin having the conditions of component (a) by polycondensation or addition polymerization reaction.

The carboxyl group-containing compound or the ester thereof with the alcohol has preferably 1 to 4, more preferably 2 carboxyl groups or carboxylate groups in a molecule. The carboxyl group-containing compound includes aliphatic carboxylic acids of 2 to 22 carbon atoms such as caprylic acid, capric acid, lauric acid, myristic acid, palmitic acid, stearic acid, oleic acid, ricinoleic acid, linoleic acid, linolenic acid, eleostearic acid, succinic acid, adipic acid, azelaic acid, sebacic acid and decamethylenedicarvoxylic acid and esters thereof with alcohols; aromatic carboxylic acids such as phthalic acid, isophthalic acid, terephthalic acid, trimellitic acid and pyromellitic acid; and alicyclic carboxylic acids such as tetrahydrophthalic acid, hexahydrophthalic acid, methylhexahydrophthalic acid, 1,4-cyclohexanedicarboxlic acid and 1,3-cyclohexanedicarboxlic acid and esters thereof with alcohols. The used alcohols are preferably monatomic alcohols of 1 to 12 carbon atoms. Examples of the monatomic alcohols are, for example, methanol, ethanol, propanol, isopropanol, butanol, sec-butanol, tert-butanol, pentanol, hexanol, heptanol, octanol, isooctanol, nonanol, decanol, 2-ethylhexanol, cyclohexanol, methylcyclohexanol and cyclooctanol.

The carboxyl group-containing compounds or the esters thereof with the alcohol may be used singly, or in combination of two or more kinds.

The hydroxyl group-containing compound is preferably that of 1 to 4 hydroxyl groups in a molecule, more preferably a diol of 2 hydroxyl groups. Examples of the hydroxyl group-containing compound are, for example, n-propyl alcohol, n-butyl alcohol, n-octyl alcohol, n-decyl alcohol, lauryl alcohol, myristyl alcohol, cetyl alcohol, n-octadecyl alcohol, polyatomic alcohols such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerin, sorbitol, neopentyl glycol, 1,8-octanediol, 1,4-cyclohexanedimethanol, 2-methyl-1,3-propanediol, 1,2,6-hexanetriol, 1,2,4 butanetriol, trimethylolethane, trimethylolpropane, pentaerythritol, quinitol, mannitol trishydroxyethyl isocyanurate and dipentaerythritol; ring-opened adducts of the polyatomic alcohols and lactones such as γ-butyrolactone and ε-caprolactone; and adducts of the polyatomic alcohols and isocyanate compounds such as tolylenediisocyanate, diphenylmethane diisocyanate, hexamethylenediisocyanate and isophoronediisocyanate in excess amount of the alcohols. The hydroxyl group-containing compounds may be used singly, or in combination of two or more kinds.

The epoxy group-containing compound has preferably 1 to 4, more preferably 1 to 2 epoxy groups, furthermore preferably one epoxy group in a molecule. Examples of the epoxy group-containing compound are, for example, aliphatic monoepoxide compounds derived from alkenes such as ethylene oxide, propylene oxide and butylene oxide; alicyclic monoepoxide compounds derived from cycloalkene such as CELOXIDE2000® (a product of Daicel Chemical Industries Co., Ltd.), CELOXIDE3000® (a product of Daicel Chemical Industries Co., Ltd.) and RIKARESIN E-8® (a product of New Japan Chemical Co., Ltd.); aromatic monoepoxide compounds containing an aromatic ring such as styrene oxide and stilbene oxide; glycidyl ethers such as methylglycidyl ether, ethylglycidyl ether propylglycidyl ether, butylglycidyl ether, octylglycidyl ether phenylglycidyl ether, (meth) allylglycidyl ether and polyalkylene oxide monoglycidyl ether; glycidyl esters such as glycidyl isobutyrate and CARDURA E-10® (a product of Shell Co.). The epoxy group-containing compounds may be used singly, or in combination of two or more kinds.

The acid anhydride includes acid anhydrides of polyatomic carboxylic acid such as succinic acid, adipic acid, glutaric acid, azelaic acid, sebacic acid, decamethylene dicarboxylic acid, phthalic acid, maleic acid, trimellitic acid, pyromellitic acid, tetrahydrophthalic acid, hexahydrophthalic acid and methylhexahydrophthalic acid. The acid anhydrides may be used singly, or in combination of two or more kinds.

The lactone includes β-propiolactone, γ-butyrolactone, δ-valerolactone and ε-caprolactone. The lactones may be used singly, or in combination of two or more kinds.

The monomers, which produce component (a), may be a compound having plural kinds of functional groups such as hydroxyl groups and carboxyl groups in a molecule. Representative examples of the compound having plural kinds of functional groups are, for example, hydroxycarboxylic acids such as α-hydroxy-propionic acid, 3-hydroxytricarballylic acid, hydroxysuccinic acid, hydroxypivalic acid and 12-hydroxystearic acid. The compound having plural kinds of functional groups may be used singly, or in combination of two or more kinds.

As other process for preparing component (a), it is possible to obtain the polyester resin (A) containing the component (a) by performing modifications such as acidolysis, alcoholysis and addition of acid anhydride to a polyester resin, which has high molecular weight out of a molecular weight of ingredient (A) or acid value of less than the lower limit of ingredient (A), as a starting material. In the polyester resins described above, a most preferable polyester resin used as the epoxy group-containing modified polyester polymer of ingredient (A) is a linear polyester resin comprising structural units of a dicarboxylic acid and a diol. Preferable dicarboxylic acids are aliphatic dicarboxylic acids of 2 to 22 carbon atoms such as succinic acid, adipic acid, azelaic acid, sebacic acid and decamethylenedicarvoxylic acid; aromatic dicarboxylic acids such as phthalic acid, isophthalic acid and terephthalic acid; and alicyclic dicarboxylic acids such as tetrahydrophthalic acid, hexahydrophthalic acid methylhexahydrophthalic acid, 1,4-cyclohexanedicarboxlic acid and 1,3-cyclohexanedicarboxlic acid. The dicarboxylic acids may be used singly, or in combination of two or more kinds.

Preferable diols are aliphatic diols of 2 to 22 carbon atoms such as ethylene glycol, 1,2-propylene glycol, 1,3-propylene glycol, 1,3-butanediol, 1,4-butanediol, 2,3-butanediol, neopentyl glycol, 1,6-hexanediol, diethylene glycol and pentanediol. The diols may be used singly, or in combination of two or more kinds.

The linear polyester resin, which comprises the structural units of the dicarboxylic acid and the diol, includes a linear polyester resin obtained by polycondensating the dicarboxylic acid and the diol, a linear polyester resin obtained by additional reaction of the dicarboxylic acid anhydride and the diol and a linear polyester resin obtained by ester interchange reaction and does not means only a linear polyester resin in which the dicarboxylic acid and the diol are used as raw materials, but means also a polyester resin in which the structural unit is the same structures as the structural unit derivated from the dicarboxylic acid and the structural unit derivated from the diol.

The linear polyester resin may contain a structural component derived from a small amount of a 3 or more functional carboxyl groups-containing compound or hydroxyl groups-containing compound within the limits of manifestation of the linear polyester resin properties for purpose of decreasing crystallinity or introducing necessary carboxyl groups in the present invention. Such examples are, for example, a carboxyl group-containing linear polyester resin obtained by addition reacting trimellitic acid to a linear polyester resin having an end hydroxyl group, a linear polyester resin branched by containing a small amount of trimethylol propane, 1,2,6-hexanetriol, trimellitic acid or pyromellitic acid in the molecular chain and a linear polyester resin introduced a small amount of a compound having 3 functional structure such as trimellitic acid and trimethylol propane in the molecular skeletal in order to decrease crystallinity. The 3 or more functional carboxyl groups-containing compound or hydroxyl groups-containing compound may be utilized singly, or in combination of two or more kinds.

The epoxy group-containing vinyl polymer, which is another structural moiety of the epoxy group-containing modified polyester polymer of ingredient (A), is the polymer of (b) an epoxy group-containing vinyl monomer.

The epoxy group-containing vinyl monomer of component (b) has preferably 1 to 4 epoxy groups, more preferably 1 to 2 epoxy groups, furthermore preferably I epoxy group in a molecule.

Examples of component (b) are, for example, epoxy group-containing vinyl monomers such as glycidyl (meth) acrylate, 3,4-epoxycyclohexyl methyl (meth ) acrylate, glycidyl (meth) allyl ether and 3,4-epoxycyclohexyl methyl (meth) allyl ether and preferably glycidyl (meth) acrylate and 3,4-epoxycyclohexyl methyl (meth) acrylate which are (meth) acrylate compounds and have higher reactivities of radical polymerization and between an epoxy group and a carboxyl group. The epoxy group-containing vinyl monomer of component (b) may be utilized singly, or in combination of two or more kinds.

The epoxy group-containing vinyl polymer is preferably a copolymer of the epoxy group-containing vinyl monomer (b) and other vinyl monomer (c).

The other vinyl monomer (c) which copolymerizes with component (b) includes, for example, (meth) acrylates, preferably a compound represented by formula (2),

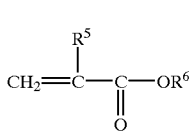

(2)

wherein $R^5$ is hydrogen atom or methyl group, $R^6$ is an organic group of 1 to 20 carbon atoms. The organic group of $R^6$ may be a saturated hydrocarbon group, hydroxyl group, acetal group, cyclocarbonate group or a reactive functional group-containing organic group such as a blocked carboxyl group represented by formula (1), but it needs to select the group which do not show stronger reactivity to the epoxy group of component (b) in condition of compolymerization of component (b), in selection of such reactive functional groups.

Examples of (meth) acrylates are, for example, methyl (meth) acrylate, ethyl (meth) acrylate, butyl (meth) acrylate, 2-ethylhexyl (meth) acrylate, lauryl (meth) acrylate, stearyl (meth) acrylate, 2-hydroxyethyl (meth) acrylate and hydroxypropyl (meth) acrylate. The other vinyl monomers are preferably esters of itaconic acid, maleic acid or fumaric acid; styrene and nuclear substituted styrene such as vinyl toluene, dimethylstyrene and ethylstyrene; acrylonitrile, vinyl acetate and vinyl chloride. These may be used singly or in combination of two or more kinds. On the other hand, undesirable examples of the vinyl monomer for compolymerizing are monomers having a functional group, which has possibility of reaction to epoxy group of component (b) in condition of the copolymerization, such as (meth) acrylic acid, itaconic acid, maleic acid and fumaric acid.

The epoxy group-containing vinyl polymer can be prepared by polymerizing the vinyl monomer of component (b) or the vinyl monomer of component (b) and other vinyl monomer of component (c).

The epoxy group-containing vinyl polymer may contain other structural component within the limits of manifestation of the present invention's effect.

In the epoxy group-containing modified polyester polymer of ingredient (A), the carboxylic groups of component (a) and a part of epoxy groups of the epoxy group-containing vinyl polymer are reacted and bonded, so that the compatibility of the two different polymers is extremely improved.

The ratio of the epoxy groups in the polymer of the epoxy group-containing vinyl monomer of component (b) bonded with the carboxyl groups in component (a) is not more than 0.1, preferably not more than 0.08, more preferably not more than 0.06 in an equivalent ratio of the carboxyl groups in the component (a) to the epoxy groups in the polymer of the component (b).

The epoxy equivalent weight of the epoxy group-containing modified polyester polymer of ingredient (A) is 200 to 2,000 g/mol, preferably 250 to 1,500 g/mol, and more preferably 275 to 1,000 g/mol. When the epoxy equivalent weight is more than 2,000 g/mol, the curing ability runs short in the case of using the epoxy group-containing modified polyester polymer of ingredient (A) in the thermosetting composition of the present invention. When the epoxy equivalent weight is less than 200 g/mol, the flexibility is impaired because the closslinking density is too high.

In the epoxy group-containing modified polyester polymer of ingredient (A), the weight ratio of the moiety consisting of component (a) to the moiety consisting of the polymer of component (b) or the polymer of component (b) and component (c) is preferably 1/99 to 80/20, more preferably 1/99 to 70/30, furthermore preferably 1/99 to 50/50. When the amount of the moiety consisting of the polymer of component (b) or the polymer of component (b) and component (c) is larger than 1/99 of the weight ratio, the flexibility of the epoxy group-containing modified polyester polymer of ingredient (A) may be insufficient. When the amount of the moiety consisting of the polymer of component (b) or the polymer of component (b) and component (c) is lower than 80/20 of the weight ratio, the hardness, chemical resistance and stain resistance of the epoxy group-containing modified polyester polymer of ingredient (A) may be decreased.

In the copolymer obtained by copolymerizing component (b) and component (c), the weight ratio of component (b) to component (c) is preferably 7/93 to 80/20, more preferably 10/90 to 70/30, furthermore preferably 15/85 to 60/40, though the epoxy equivalent weight of component (b) influences. When the amount of component (b) is lower than 7/93 of the weight ratio of component (b) to component (c), the curing ability may run short in the case of using the epoxy group-containing modified polyester polymer of ingredient (A) in the thermosetting composition of the present invention. When the amount of component (b) is larger than 80/20 of the weight ratio of component (b) to component (c), the flexibility of the epoxy group-containing modified polyester polymer of ingredient (A) may be impaired. The epoxy group-containing modified polyester polymer of ingredient (A) may contain other structural component except for the structural component described above within the limits of manifestation of the present invention's effect.

The epoxy group-containing modified polyester polymer of ingredient (A) is generally suitable to be 1 to 2,000 poise in the viscosity at 20° C. of the organic solvent solution containing nonvolatile matter of 50±1 percent.

The preferable process for preparing the epoxy group-containing modified polyester polymer of ingredient (A) is explained in the following.

The epoxy group-containing modified polyester polymer of ingredient (A) can be preferably produced by polymerizing the epoxy group-containing vinyl monomer (b) with a radical polymerization initiator in the presence of the carboxyl group-containing polyester resin (a) having a number average molecular weight of 1,500 to 50,000 and a resin acid value of 2 to 30 mgKOH/g and an organic solvent.

In this process for preparation, it is preferable to polymerize the other vinyl monomer (c) together with the epoxy group-containing vinyl monomer (b).

The carboxyl group-containing polyester resin (a) can be utilized in the same member as described above.

The epoxy group-containing vinyl monomer of component (b) and the other vinyl monomer of component (c) can be utilized in the same member as described above.

The epoxy group-containing vinyl monomer of component (b) polymerizes together with the other epoxy group-containing vinyl monomer of component (b) or copolymerizes together with the other vinyl monomer of component (c) and forms a chemical bond to the carboxyl group in component (a). Therefore, the epoxy group-containing vinyl monomer of component (b) has act to form the chemical bond between the polymer of the epoxy group-containing vinyl monomer of component (b) and the carboxyl group-containing polyester resin of component (a), so that the compatibility of the two different polymers can be extremely improved. Further, it is possible to introduce a lot of epoxy groups into the epoxy group-containing modified polyester polymer of ingredient (A) with the remained epoxy groups of the epoxy groups of component (b), which do not react the carboxyl groups in the component (a).

The amount of component (b) is selected to be not more than 0.1, preferably not more than 0.08, more preferably not more than 0.06 in the equivalent ratio of the carboxyl groups of component (a) to the epoxy groups of component (b). It is possible to proceed the polymerization and simultaneously form the chemical bond between the polymer of the vinyl monomer and component (a) efficiently by using an excess amount of component (b) to the carboxyl group of component (a). When the equivalent ratio of the carboxyl group of component (a) to the epoxy group of component (b) is more than 0.1, it trends that the sufficient chemical bonds between the polymer of the vinyl monomer of component (b) and the component (a) is not obtained and the phase separation is caused. The weight ratio of component (a) to component (b) or the total amount of component (b) and component (c) is preferably 1/99 to 80/20, more preferably 1/99 to 70/30, furthermore preferably 1/99 to 50/50. When the amount of component (b) or the total amount of component (b) and component (c) is larger than 1/99 of the weight ratio, the flexibility of the epoxy group-containing modified polyester polymer of ingredient (A) may be insufficient. When the amount of component (b) or the total amount of component (b) and component (c) is lower than 80/20 of the weight ratio, the hardness, the chemical resistance and the stain resistance of the epoxy group-containing modified polyester polymer of ingredient (A) may be decreased.

The weight ratio of component (b) to component (c) is the same as described above.

The radical initiator, which is utilized in the process for preparing the epoxy group-containing modified polyester polymer of ingredient (A), includes azo compounds such as 2,2'-azobisisobutyronitrile, 2,2'-azobis-2,4-dimethylvaleronitrile, 4,4-azobis-4-cyano valeric acid, 1-azobis-1-cyclohexane carbonitrile and dimethyl-2,2'-azobis-isobutylate; organic peroxides such as methylethylketone peroxide, cyclohexanone peroxide, 3,5,5-trimethylhexanone peroxide, 1,1-bis (t-butyl peroxy)-3,3,5-trimethylhexane, 1,1-bis (t-butyl peroxy)-cyclohexane, 2,2-bis (t-butyl peroxy) octane, t-butyl hydroperoxide, diisopropylbenzene hydroperoxide, dicumyl peroxide, t-butylcumyl peroxide, isobutyl peroxide, lauroyl peroxide, benzoyl peroxide, diisopropyl peroxydicarbonate, t-butyl peroxy-2-ethylhexanoate, t-butyl peroxy neodecanate, t-butyl peroxy laurate, t-butyl peroxy benzoate and t-butyl peroxy isopropylcarbonate. The above initiators may be used singly or in combination of two or more kind. It is preferable to select from azo compounds or organic peroxides having a 10 hour half-life temperature of 50° C. or more among the radical initiators described above because it needs to proceed simultaneously both the polymerization reaction of the vinyl monomers comprising component (b) and the reaction between the carboxyl groups of component (a) and the epoxy groups of component (b). Such azo compounds and such organic peroxides include 2,2'-azobisisobutyronitrile, methylethylketone peroxide, cyclohexanone peroxide, 3,5,5-trimethylhexanone peroxide, 1,1-bis (t-butyl peroxy)-3,3,5-trimethylhexane, 1,1-bis (t-butyl peroxy)-cyclohexane, 2,2-bis (t-butyl peroxy) octane, t-butyl hydroperoxide, diisopropylbenzene hydroperoxide, dicumyl peroxide, t-butylcumyl peroxide, lauroyl peroxide, benzoyl peroxide, t-butyl peroxy 2-ethylhexanoate, t-butyl peroxy neodecanate, t-butyl peroxy laurate, t-butyl peroxy benzoate and t-butyl peroxy isopropylcarbonate. The initiators may be optionally used in combination of a reducing agent such as dimethyl aniline, ferrous salts such as ferrous sulfate, ferrous chloride, ferrous acetate; acid sodium sulfite, sodium thiosulfate and Rongalit, but it needs to select the reducing agent for the polymerization temperature not to be too low.

The organic solvent, which is used in preparing ingredient (A) of the present invention, is preferably an organic solvent which has not a functional group capable of reacting the carboxyl group of component (a) or the epoxy group of component (b).

The suitable examples of the organic solvent used in preparing ingredient (A) of the present invention are, for example, aliphatic hydrocarbons such as cyclohexane and ethylcyclohexane; aromatic hydrocarbon solvents such as toluene, xylene, ethylbenzene and aromatic naphtha; ketone solvents such as acetone, methyl ethyl ketone, methyl isobutyl ketone, cyclohexanone and isophorone; ester solvents such as ethyl acetate, n-butyl acetate, isobutyl acetate, 3-methoxybutyl acetate and bis (2-ethylhexyl) adipate; ether solvents such as dibutyl ether, tetrahydrofuran, 1,4-dioxane and 1,3,5-trioxane and nitrogen-containing solvents such as acetonitrile, valeronitrile, N, N-dimethylformamide and N, N-diethylformamide. The above solvents may be used singly or in combination of two or more kinds. The nonvolatile matter concentration of the epoxy group-containing modified polyester polymer can be arbitrarily selected within the limits of the dispersion stability of the polymer, and is generally 10 to 70 percent.

The conventional reaction catalysts such as a Lewis acid, a tertiary amine, an ammonium salt and a phosphonium salt are optionally used singly or in combination of plural kinds for the purpose of accelerate the reaction between the carboxyl group of component (a) and the epoxy group of component (b).

A mixing method of component (a) and the vinyl monomer comprising component (b) and an additional method of the organic solvent and the radical polymerization initiator are arbitrary in preparing the epoxy group-containing modified polyester polymer of ingredient (A). Preferable methods are a method that the vinyl monomer comprising component (b) or the organic solvent solution thereof is dropped from a dropping vessel while stirring component (a) or the organic solvent solution thereof charged in a reaction vessel in order to control polymerization heat and reaction heat, and a method that both of component (a) or the organic solvent solution thereof and component (b) or the organic solvent solution thereof are dropped from a dropping vessel. The vinyl monomer comprising component (b) may be only the epoxy group-containing vinyl monomer of component (b) or the mixture of the epoxy group-containing vinyl monomer of component (b) and the other vinyl monomer of component (c).

The polymerization temperature is preferably 50 to 200° C., more preferably 80 to 160° C., though it is different according to the kind of the radical polymerization initiators, presence or absence of reducing agents used together with them, or presence or absence of reaction catalysts of the carboxyl group and the epoxy group. When the polymerization temperature is less than 50° C., the reaction between the carboxyl group of component (a) and the epoxy group of component (b) may be not sufficiently proceeded, so that the phase separation between the vinyl monomer and the polyester resin may be easily caused. When the polymerization temperature is more than 200° C., unexpected side reactions such as depolymerization may occur.

The epoxy group-containing modified polyester polymer of ingredient (A) may be obtained as a transparent solution or a milky white dispersion liquid according to the resin acid value or the molecular weight of component (a), the molecular weight of the polymer of the vinyl monomers comprising component (b) or the mixture of component (b) and component (c), the content of the vinyl monomers comprising component (b) or the mixture of component (b) and component (c), or the kind of the solvents in the polymerization. It is appears that the milky white dispersion liquid is caused by the micro phase separation between the polyester moiety and the the polymer moiety of the vinyl monomer of the produced epoxy group-containing modified polyester polymer. The epoxy group-containing modified polyester polymer in the range of the present invention is excellent in the stability of the dispersion liquid, so that the problems are not caused in the storage stability, the transparency during forming the paint film and the gloss.

The compound used as ingredient (B) in the thermosetting composition of the present invention is the compound having in the molecule two or more, preferably from 2 to 50 functional groups of the following formula (1):

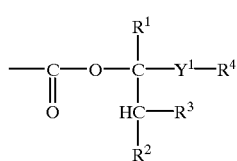

(1)

wherein $R^1$, $R^2$, $R^3$, $R^4$ an $Y^1$ have the same meaning as described above. The functional group having the formula (1) is easily prepared by reaction of carboxyl group with a vinyl ether, a vinyl thioether or a heterocyclic compound having oxygen or sulfur as the hetero atom and having a vinyl type double bond which is described by formula (3):

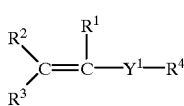

(3)

wherein $R^1$, $R^2$, $R^3$, $R^4$ an $Y^1$ have the same meaning as described above.

In the formula (1) and formula (3), $R^1$, $R^2$ and $R^3$ are selected from the group consisting of a hydrogen atom and an organic group, such as an alkyl group, an aryl group and an alkaryl group of 1 to 18 carbon atoms, $R^4$ is an organic group, such as an alkyl group, an aryl group and an alkaryl group of 1 to 18 carbon atoms. The organic groups may have substituted groups in the molecule and $R^3$ and $R^4$ may, by bonding together, form a heterocyclic structure with or without substituents and having $Y^1$ as the hetero atom component.

Preferable examples of $R^1$, $R^2$ and $R^3$ are a hydrogen atom, alkyl groups, aryl groups and alkaryl groups of 1 to 10 carbon atoms. Preferable examples of $R^4$ are alkyl groups, aryl groups and alkaryl groups of 1 to 10 carbon atoms. The alkyl groups also contain cycloalkyl groups and aralkyl groups.

Suitable examples of the alkyl groups are, for example, methyl, ethyl, n-propyl, isopropyl, n-butyl, isobutyl, tert butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, 2-ethylhexyl, 3-methylheptyl, n-nonyl, methyloctyl, ethylheptyl, n-decyl, n-undecyl, n-dodecyl, n-tetradecyl, n-heptadecyl and n-octadecyl. The alkyl groups also contain cycloalkyl groups such as cyclobutyl and cyclohexyl.

Preferable alkyl groups are alkyl groups of I to 10 carbon atoms.

Examples of the preferable alkyl groups are methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, 2-ethylhexyl, 3-methylheptyl, n-nonyl, methyloctyl, ethylheptyl, n-decyl and cyclohexyl.

Also, the alkyl groups contain aralkyl groups. Suitable examples of the aralkyl groups are benzyl, 1-phenylethyl, 2-phenylethyl, 2-phenylpropyl, 3-phenylpropyl, 4-phenylbutyl, 5-phenylpentyl, 6-phenylhexyl, 1-(4-methylphenyl) ethyl, 2-(4-methylphenyl) ethyl and 2-methylbenzyl.

Suitable examples of the aryl groups and the alkaryl groups are, for example, aryl groups such as phenyl, tolyl, xylyl and naphtyl; and alkaryl groups such as 4-methylphenyl, 3,4-dimethylphenyl, 3,4,5-trimethylphenyl, 2-ethylphenyl, n-butylphenyl, tert-butylphenyl, amylphenyl, hexylphenyl, nonylphenyl, 2-tert-butyl-5-methylphenyl, cyclohexylphenyl, cresyl, oxyethylcresyl, 2-methyl-4-tert-butylphenyl and dodecylphenyl. Preferable examples of the aryl groups and the alkaryl groups are aryl groups and alkaryl groups of 6 to 10 carbon atoms such as phenyl, tolyl, xylyl, 4-methylphenyl, 3,4-dimetylphenyl, 3,4,5-trimethylphenyl, 2-ethylphenyl, n-butylphenyl and tert-butylphenyl.

Examples of the compound of the formula (3) include aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether and cyclohexyl vinyl ether aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether and cyclohexyl vinyl thioether;cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-on, 3,4-dihydro-2-ethoxy-2H-pyran and sodium 3,4-dihydro-2H-pyran-2-carboxylate; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl-2H-thiopyran-2-on, 3,4-dihydro-2-ethoxy-2H-thiopyran and sodium 3,4-dihydro-2H-thiopyran 2-carboxylate.

The compound of ingredient (B) is prepared by the reaction of a compound having two or more, preferably 2 to 50, carboxyl groups in the molecule with the compound having the formula (3). Examples of the compound having two or more carboxyl groups in the molecule are: aliphatic polycarboxylic acids of 2 to 22 carbon atoms, such as succinic acid, adipic acid, azelaic acid, sebacic acid and decamethylenedicarboxylic acid; aromatic polycarboxylic acids, such as phthalic acid, isophathalic acid, terephathalic acid, trimellitic acid and pyromellitic acid; alicyclic polycarboxylic acids, such as tetrahydrophthalic acid, hexahydrophthalic acid and methylhexahydrophthalic acid; resins having two or more carboxyl groups in the molecule, such as polyester resins, acrylic resins, polybutadiene resins modified with maleic acid and the like resins having two or more carboxyl groups in the molecule; and silicone oils containing carboxyl groups, such as X-22-162A° and X-22-162C® (a product of Shin-Etsu Chemical Co., Ltd).

The compound having two or more carboxyl groups in the molecule is prepared by: (1) half-esterification of a polyol having two or more, preferably 2 to 50, hydroxyl groups in the molecule with an acid anhydride; (2) addition of a polyisocyanate compound having two or more, preferably 2 to 50 isocyanate groups in the molecule with a hydroxycarboxylic acid or an amino acid; (3) homopolymerization of an α,β-unsaturated monomer having a carboxyl group or copolymerization of the α,β-unsaturated monomer with other α,β-unsaturated monomers; (4) preparation of polyester resin having carboxyl groups.

Examples of the polyol having two or more hydroxyl groups include: polyols such as ethylene glycol, 1,2-propylene glycol, 1,3-propylene glycol, 1,3-butanediol, 1,4-butanediol, 2,3 butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate and dipentaerythritol; addition products of the polyhydric alcohols with a lactone, such as γ-butyrolactone and ε-caprolactone, by ring opening of the lactone; addition products of the polyhydric alcohol with an isocyanate, such as tolylene diisocyanate, diphenylmethane diisocyanate, hexamethylene diisocyanate and isophorone diisocyanate, in excess amount of the alcohol; addition products of the polyhydric alcohols with a divinyl ether, such as ethylene glycol divinyl ether, polyethylene glycol divinyl ether, butanediol divinyl ether, pentanediol divinyl ether, hexanediol divinyl ether and 1,4-cyclohexanedimethanol divinyl ether, in excess amount of the alcohol; condensation products of the polyhydric alcohol with an alkoxysilicone compound, such as KR-213®, KR-217®, KR 9218® (products of Shin-Etsu Chemical Co., Ltd.), in excess amount of the alcohol; and silicone oils containing hydroxyl groups, such as X-22-160AS® and KF-6001® (a product of Shin-Etsu Chemical Co., Ltd).

Examples of the acid anhydride which reacts with the polyol having two or more hydroxyl groups in the molecule include: acid anhydrides of polycarboxylic acids, such as succinic acid, glutaric acid, adipic acid, azelaic acid, sebacic acid, decamethylenedicarboxylic acid, phthalic acid, maleic acid, trimellitic acid, pyromellitic acid, tetrahydrophthalic acid and hexahydrophthalic acid.

Examples of the polyisocyanate compound having two or more isocyanate groups in the molecule include: p-phenylene diisocyanate, biphenyl diisocyanate, tolylene diisocyanate, 3,3'-dimethyl-4,4'-biphenylene diisocyanate, 1,4-tetramethylene diisocyanate hexamethylene diisocyanate, 2,2,4-trimethylhexane-1,6-diisocyanate, methylene-bis-(phenyl isocyanate), lysine methyl ester diisocyanate, bis-(isocyanatoethyl) fumarate, isophorone diisocyanate methylcyclohexyldiisocyanate, 2-isocyanatoethyl-2,6-diisocyanatohexanoate, biuret derivatives of these polyisocyanates, and isocyanurate drivatives of these polyisocyanates.

Examples of the hydroxycarboxylic acid which reacts with the polyisocyanate compound include: lactic acid, citric acid, hydroxypivalic acid, 12-hydroxystearic acid and malic acid. Examples of the amino acid which reacts with the polyisocyanate compound include: DL-alanine, L-glutamic acid, glycine, L-teanine, glycylglycine, aminocaproic acid, L-aspartic acid, L-citrulline, L-arginine, L-leucine and L-serine.

Examples of the vinyl monomer having a carboxyl group include: acrylic acid, methacrylic acid, itaconic acid, mesaconic acid, maleic acid and fumaric acid. Examples of the other vinyl monomer include: methylacrylate, ethylacrylate, n-propylacrylate isopropylacrylate, n-butylacrylate, isobutylacrylate, sec-butylacrylate, cyclohexylacrylate, 2-ethylhexylacrylate, stearylacrylate, laurylacrylate, methylmethacrylate, ethylmethacrylate, n-propylmethacrylate, isopropylmethacrylate, n-butylmethacrylate isobutylmethacrylate, sec-butylmethacrylate, cyclohexylmethacrylate, 2-ethylhexylmethacrylate, stearylmethacrylate, laurylmethacrylate styrene, a-methylstyrene, p-vinyltoluene and acrylonitrile.

The compound of ingredient (B) can be obtained by homopolymerizing the reaction product of the compound represented by formula (3) described above and the vinyl carboxylic acid such as acrylic acid, methacrylic acid, itaconic acid, mesaconic acid, maleic acid and fumaric acid, or by copolymerizing the reaction product and other vinyl monomers which do not have the reactive functional group. The vinyl monomers which do not have the reactive functional group include methylacrylate, ethylacrylate, n-propylacrylate, isopropylacrylate, n-butylacrylate, isobutylacrylate, sec-butylacrylate, cyclohexylacrylate, 2-ethylhexylacrylate, stearylacrylate, laurylacrylate, methylmethacrylate, ethylmethacrylate, n-propylmethacrylate, isopropylmethacrylate, n-butylmethacrylate isobutylmethacrylate, sec-butylmethacrylate, cyclohexylmethacrylate, 2-ethylhexylmethacrylate, stearylmethacrylate, laurylmethacrylate, styrene, α-methylstyrene, p-vinyltoluene, acrylonitrile, vinyl acetate and vinyl chloride.

The polyester resin having end carboxyl groups can be easily prepared according to the conventional preparation method of polyester resins in excess amount of the polyacid in relation to the amount of the polyol.

The reaction of the compound having two or more carboxyl group in the molecule with the compound having the formula (3) is generally performed at a temperature between room temperature and 100° C in the presence of an acid catalyst.

The ingredient (B) can be a self-crosslinkable compound having functional groups which can form chemical bonds with the formula (1), within the limits of the storage stability of the thermosetting composition of the present invention. The reactive functional group include: epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group. Such self-crosslinkable compound can be prepared by using the compound having one or more carboxyl groups, preferably 2 to 50 carboxyl groups and one or more reactive functional groups in the molecule as a starting material in the same process as described in the preparation method of the compound of ingredient (B), or by copolymerizing the unsaturated compound having the functional groups of formula (1) and the unsaturated compound having the reactive functional groups.

The compound of ingredient (B) may be used singly or in combination of two or more kind in the thermosetting composition of the present invention.

The thermosetting composition of the invention comprises essentially the ingredient (A) and the ingredient (B). The blend ratio of the ingredient (A) and the ingredient (B) is preferable to adjust the equivalent ratio of the functional group of the formula (1) and the epoxy group and the optionally introduced reactive functional group of ingredient (B) to form chemical bond with the former functional group utilized in the thermosetting composition in the range from 0.2:1.0 to 1.0:0.2.

The functional groups having the formula (1) in the ingredient (B) of the invention regenerate free carboxyl group by heating and form chemical linkages with the reactive functional groups in the ingredient (A). As active ester based on the internal polarization structure, the functional groups of the ingredient (B) can also react with the epoxy groups in the ingredient (A) or the reactive functional groups in the ingredient (B) by addition. This addition reactions can contribute to decreasing amount of volatile organic substances discharged into air because the addition reactions are not accompanied with elimination reactions during the crosslinking.

Conventional acid catalysts such as Lewis acids and protonic acids can be widely used in the thermosetting composition of the present invention in order to accelerate the curing ability. The preferable acid catalysts among the acid catalysts are thermal latent acid catalysts which show activity in the curing condition during heating for the purpose of keeping excellent storage stability of the composition for a long period of time, promoting the curing reaction in curing at lower temperatures and for short time, and giving excellent chemical properties, physical properties to the cured product. The thermal latent acid catalysts of ingredient (C) are desirably a compounds which show acid catalyst activity at the temperatures of 50° C. or above. When the thermal latent acid catalyst shows acid catalyst activity at the temperatures of less than 50° C., the obtained composition may be in danger of causing undesirable situations such as the increase of viscosity and the gelation during storage.

More preferable examples of the thermal latent acid catalyst of ingredient (C) are compounds prepared by neutralizing protonic acids with Lewis bases, compounds prepared by neutralizing Lewis acids with Lewis bases, mixtures of Lewis acids and trialkyl phosphate, esters of sulfonic acids, esters of phosphoric acid, onium compounds, compounds comprising (I) a epoxy group-containing compound, (II) a sulfur atom-containing compound and (III) a Lewis acid, or these compounds and (IV) a carboxyl compound and/or a carboxylic acid anhydride compound.

The compounds prepared by neutralizing protonic acids with Lewis bases include, for example, compounds prepared by neutralizing halogenocarboxylic acids, sulfonic acids, monoesters of sulfuric acid, monoesters and diesters of phosphoric acid, esters of polyphosphoric acid, or monoesters and diesters of boric acid with amines, such as ammonia, monoethylamine, triethylamine, pyridine, piperidine, aniline, morpholine, cyclohexylamine, n-butylamine, monoethanol amine, diethanol amine and triethanol amine; with trialkylphosphine, triarylphosphine, trialkylphosphite, or triarylphosphite, and Nacure 2500X®, Nacure X-47-110®, Nacure 3525® and Nacure 5225 ® (products of King Industry Co., Ltd) as the commercial acid-base blocked catalysts.

The compounds prepared by neutralizing Lewis acids with Lewis bases include, for example, compounds prepared by neutralizing Lewis acids such as $BF_3$, $FeCl_3$, $SnCl_4$, $AlCl_3$ and $ZnCl_2$ with Lewis bases described above and mixtures of Lewis acids described above and trialkylphosphate, The esters of sulfonic acids are compounds having the formula (4)

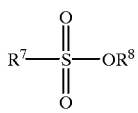

(4)

wherein $R^7$ is selected from the group consisting of phenyl group, substitued phenyl group, naphthyl group, substituted naphthyl group and alkyl group and $R^8$ is a group of 3 to 18 carbon atoms bonded with sulfonyloxy group through a primary or secondary carbon atom which is selected from the group consisting of alkyl group, alkenyl group, aryl group, alkaryl group, alkanol group, saturated or unsaturated cycloalkyl group and saturated or unsaturated hydroxycycloalkyl group. Examples of the above compounds are esters of sulfonic acids such as methane sulfonic acid, ethane sulfonic acid, benzene sulfonic acid, dodecylbenzene sulfonic acid, naphthalene sulfonic acid and nonylnaphthalene sulfonic acid, with primary alcohols such as n-propanol, n-butanol, n-hexanol and n-octanol, or secondary alcohols such as isopropanol, 2 butanol, 2-hexanol, 2-octanol and cyclohexanol, and β-hydroxyalkylsulfonic esters prepared by the reaction of the sulfonic acid and compounds containing oxirane group.

The esters of phosphoric acid are, for example, compounds having the formula (5)

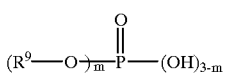

(5)

wherein $R^9$ is a group of 3 to 10 carbon atoms selected from the group consisting of alkyl group, cycloalkyl group and aryl group and m is 1 or 2. Examples of the above compounds are monoesters and diesters of phosphoric acid with primary alcohols such as n-propanol, n-butanol, n-hexanol, n-octanol and 2-ethylhexanol, or secondary alcohols such as isopropanol, 2-butanol, 2-hexanol, 2-octanol and cyclohexanol.

The onium compounds are, for example, compounds having one of the formulas (6) to (9):

(6)

(7)

(8)

and

(9)

wherein $R^{10}$ is a group of 1 to 12 carbon atoms selected from the group consisting of alkyl group, alkenyl group, aryl group, alkaryl group, aklanol group and cycloalkyl group, two $R^{10}$ groups may be bonded together to form a heterocyclic ring in which N, P, O or S is the hetero atom, $R^{11}$ is a hydrogen atom or a group of 1 to 12 carbon atoms selected from the group consisting of alkyl group, alkenyl group, aryl group and alkaryl group and X is selected from the group consisting of $SbF_6^-$, $AsF_6^-$, $PF_6^-$ and $BF_4^-$.

Suitable examples of the epoxy compound (I), which is used in the thermal latent acid catalyst comprising the epoxy group-containing compound (I), the sulfur atom-containing compound (II) and the Lewis acid (III), or component (I), (II) and (III) and the carboxylic acid compound and/or the carboxylic acid anhydride compound (IV), include aliphatic monoepoxide compounds derived from alkene such as ethyleneoxide, propyleneoxide and butyleneoxide; alicyclic monoepoxide compounds derived cycloalkene such as cyclohexeneoxide, CELOXIDE2000 ® (a product of Daicel Chemical Industries Co., Ltd.), CELOXIDE3000® (a product of Daicel Chemical Industries Co., Ltd.), RIKARESIN E-8 ® (a product of New Japan Chemical Co., Ltd.), 3,4-epoxycyclohexyl methyl acrylate and 3,4-epoxycyclohexylmethyl methyacrylate; aromatic monoepoxide compounds such as styreneoxide and stilbeneoxide glycidylether compounds such as methylglycidylether, ethylglycidylether propylglycidylether, butylglycidylether, octylglycidylether phenylglycidylether, allylglycidylether and polyalkyleneoxide monoglycidylether; glycidylester compounds such as glycidylisobutyrate, CARDURA E-10® (a product of Shell Co.), glycidylacrylate and glycidylmethacrylate; epoxy plasticizers such as SANSOCIZER E-4030® (a product of New Japan Chemical Co., Ltd.) and SANSOCIZER E-6000® (a product of New Japan Chemical Co., Ltd.); homopolymers of monomers having an epoxy group such as glycidylacrylate, glycidylmethacrylate, allylglycidylether, 3,4-epoxycyclohexylmethyl acrylate and 3,4-epoxycyclohexylmethyl methacrylate or copolymers of the monomers having an epoxy group and one or more of the other monomers; bisphenol type epoxy resin polymers having epoxy groups such as polyglycidyl compounds obtained by reacting polycarboxylic acids with epichlorohydrin or polyols with epichlorohydrin. Preferable examples are propyleneoxide, butyleneoxide, SANSOCIZER E-4030® (a product of New Japan Chemical Co., Ltd.), SANSOCIZER E—6000® (a product of New Japan Chemical Co., Ltd.), RIKARESIN E-8® (a product of New Japan Chemical Co., Ltd.), cyclohexeneoxide, CELOXIDE3000® (a product of Daicel Chemical Industries Co., Ltd.), methylglycidylether, ethylglycidylether, propylglycidylether, butylglycidylether, CARDURA E-10® (a product of Shell Co.), homopolymers of glycidylacrylate, glycidylmethacrylate, allylglycidylether, 3,4-epoxycyclohexylmethylacrylate and 3,4-epoxycyclohexylmethyl methacrylate or copolymers of the monomers and one or more of the other monomers.

When the epoxy group-containing compound is a polymer, the content of the epoxy groups is preferably in the range from 0.1 to 7 mol/kg, more preferably 0.35 to 5 mol/kg.

Either a single kind of the epoxy group-containing compound or a combination of two or more kinds of the epoxy group-containing compound may be utilized.

Suitable examples of sulfur atom-containing compound (II), which is used in the thermal latent acid catalyst, include alkyl sulfides such as dimethyl sulfide, diethyl sulfide, di-n-propyl sulfide, di-n-butyl sulfide, di-n-hexyl sulfide, diisopropyl sulfide, di-sec-butyl sulfide, di-tert-butyl sulfide, di-n-octyl sulfide and di-2-ethylhexyl sulfide; hydroxyalkyl sulfides or the derivates such as 2-(ethylthio) ethanol, 2,2'- thiodiethanol and bis (2-methoxyethyl) sulfide; sulfur atom-containing compounds having an aromatic ring such as diphenyl sulfide and thioanisole; sulfur atom-containing compounds having a carboxylic acid ester portion such as methyl methylthioacetate, ethyl methylthiopropionate and dimethyl thiodipropionate; sulfur atom-containing compounds having a nitrile group such as thiodipropionitrile; cyclic sulfur atom-containing compounds such as tetrahydrothiophene, tetrahydrothiapyran, 1,2-oxathiorane, 1,3-oxathiorane and 1,3-oxathiane, 1,4-oxathiane. Preferable examples of sulfur atom-containing compound (II) are alkyl sulfides such as di-n-propyl sulfide, di-n-butyl sulfide, di n-hexyl sulfide, di-isopropyl sulfide, di-sec-butyl sulfide, di-tert-butyl sulfide, di-n-octyl sulfide, di-2-ethylhexyl sulfide, 2-(ethylthio) ethanol, bis (2-methoxyethyl) sulfide, methyl methylthioacetate, ethyl methylthiopropionate tetrahydrothiophene and 1,4-oxathiane.

Either a single kind of the sulfur atom-containing compound (II) or a combination of two or more kinds of the sulfur atom-containing compound (II) may be utilized.

Suitable examples of the Lewis acid (III), which is used in the thermal latent acid catalyst, are: metal halides, such as boron trifluoride, aluminium trichloride, titanium trichloride, titanium tetrachloride, ferrous chloride, ferric chloride, zinc chloride, zinc bromide, stannous chloride, stannic chloride, stannous bromide and stannic bromide; organometallic compounds, such as trialkylboron, trialkylaluminium, dialkylaluminium halides, monoalkylalminium halides and tetraalkyltin; metallic chelate compounds such as diisopropoxyethylacetoacetate aluminium, tris (ethylacetoacetate aluminium, isopropoxy bis (ethylacetoacetate) aluminium, monoacetylacetonato • bis (ethylacetoacetate) aluminium, tris (n-propylacetoacetate) aluminium, tris (n-butylacetoacetate) aluminium, monoethylacetoacetate • bis (acetylacetonato) aluminium, tris (acetylacetonato) aluminium, tris (propionylacetonato) aluminium, acetylacetonato • bis (propionylacetonato) aluminium, diisopropoxy bis (ethylacetoacetate) titanium, diisopropoxy • bis (acetylacetonato) titanium, tetrakis (n-propylacetoacetate) zirconium, tetrakis (acetylacetonato) zirconium, tetrakis (ethylacetoacetate) zirconium, dichloro•bis (acetylacetonato) tin, dibutyl-bis (acetylacetonato) tin, tris (acetylacetonato) iron, tris (acetylacetonato) chromium, tris (acetylacetonato) rhodium, bis (acetylacetonato) zinc and tris (acetylacetonato) cobalt; metallic soaps such as dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminium stearate, calcium stearate, cobalt stearate, zinc stearate and lead stearate. Preferable examples of the Lewis acid are chelate compounds containing boron, aluminium, tin, titanium, zinc or zirconium, metallic soaps and halides.

The Lewis acid (III) may be utilized singly or in combination of two or more kinds.

Suitable examples of the carboxylic acid (IV), which is used in the thermal latent acid catalyst, include monocarboxylic acid such as formic acid, acetic acid, propionic acid, butyric acid, 2-ethylhexanoic acid, lauric acid, stearic acid, oleic acid, linoleic acid, linolenic acid, acrylic acid, methacrylic acid, monochloroacetic acid, dichloroacetic acid and trichloroacetic acid; polycarboxylic acid such as succinic acid, glutaric acid, adipic acid, azeleic acid, sebacic acid, decamethylene dicarboxylic acid, phthalic acid, maleic acid, trimellitic acid, pyromellitic acid, tetrahydrophthalic acid, hexahyrophthalic acid, methyl hexahydrophthalic acid, itaconic acid, methaconic acid and fumaric acid; acrylic resins containing carboxyl groups and polyester resins containing carboxyl groups. Preferable examples of the carboxylic acid are monocarboxylic acids or polycarboxylic acids having lower molecular weight. More preferable examples of the carboxylic acid are monocarboxylic acids or polycarboxylic acids having molecular weight of not more than 3000.

Suitable examples of the carboxylic acid anhydride compounds (IV), which is used in the thermal latent acid catalyst, include low molecular weight caboxylic anhydride such as acetic anhydride, propionic anhydride, butyric anhydride, isobutyric anhydride, lauric anhydride, oleic anhydride, linoleic anhydride, stearic anhydride, linolenic anhydride, succinic anhydride, phthalic anhydride, maleic anhydride, trimellitic anhydride, pyromellitic anhydride, isovaleric anhydride, n-caproic anhydride, n-caprylic anhydride, n-capric anhydride, citraconic anhydride, gultaric anhydride, itaconic anhydride, crorendic anhydride, palmitic anhydride, myristic anhydride, tetrapropenyl succinic anhydride, tetrahrydophthalic anhydride, hexahydrophthalic anhydride, 4-methylhexahydrophthalic anhydride, endomethylenetetrahydrophthalic anhydride methylendomethylenetetrahydrophthalic anhydride, tetrachlorophthalic anhydride, 3-nitrophthalic anhydride, trichloroacetic anhydride, dichloroacetic anhydride, monochloroacetic anhydride, trifluoroacetic anhydride and heptafluorobutyric anhydride and polymers having carboxylic acid anhydride groups such as acrylic resins containing acid anhydride groups and polyester resins containing acid anhydride groups. Preferable examples of the carboxylic acid anhydride are acetic anhydride, propionic anhydride, butyric anhydride, isobutyric anhydride, lauric anhydride, oleic anhydride, stearic anhydride, n-caproic anhydride, n-caprylic anhydride, n-capric anhydride, palmitic anhydride, myristic anhydride.trichloroacetic anhydride, dichloroacetic anhydride, monochloroacetic anhydride, trifluoroacetic anhydride and heptafluorobutyric anhydride.

The carboxylic acid compound and the carboxylic acid anhydride compound (IV) may be utilized singly or in combination of two or more kinds.

The thermal latent acid catalyst of ingredient (C) may be used singly or in combination of two or more kinds in the present thermosetting composition. The amount of the thermal latent acid catalyst is selected in the range of 0.01 to 20 parts by weight, preferably 0.02 to 10 parts by weight based on 100 parts by weight of the total nonvolatile matter of ingredient (A) and ingredient (B). When the amount of the thermal latent acid catalyst is less than 0.01 percent by weight, the promoting effect of the reaction is not sufficiently manifested because the amount of the catalyst is too little. When the amount of the thermal latent acid catalyst is more than 20 percent by weight, the promoting effect is lower than the value expected by the amount of the catalysts and the decrease in properties of the cured film may be caused by the presence of the catalyst in great quantities as residue in the cured film.

In the thermosetting composition of the present invention, a dispersing component of at least one inorganic oxide sol selected from the group consisting of aluminium oxide sol, silica sol, zirconium oxide sol and antimony oxide sol can be utilized as a ceramic ingredient of ingredient (D). Preferable inorganic oxide sol is silica sol. It is possible to obtain the paint film having high hardness and excellent elasticity by formulating the dispersing component of the inorganic oxide sol in the present thermosetting composition.

The inorganic oxide sols may be supplied as aqueous dispersing system. In the case of the aqueous dispersing system, the inorganic oxide sols can be utilized after converting the water phase into the desired organic solvent phase. Preferable organic solvents include ketone solvents such as methylisobutylketone and cyclohexanone.

As methods of the phase conversion includes, for example, a method that comprising adding water-soluble organic solvent into the aqueous dispersing component distilating water, and repeating the operation of the addition and the distillation and to convert the phase into the desired organic solvent.

The dispersing component of an silica sol can be produced by adding silicon tetrahalide into water, or by adding acid into aqueous sodium silicate solution. Examples of commercial aqueous dispersing components are SNOWTEX-O (trade name, a product of Nissan Chemical Industries, Ltd.) and SNOWTEX-N (trade name, a product of Nissan Chemical Industries, Ltd.). Examples of commercial organic solvent dispersing components are SNOWTEX-MIBK-ST (trade name, a product of Nissan Chemical Industries Co. Ltd.).

The dispersing component of an inorganic oxide sol is preferably a dispersing component of an inorganic oxide sol surface-treated with a silane coupling agent, more preferably a dispersing component of silica sol surface-treated with a silane coupling agent. The surface-treated dispersing component of an inorganic oxide sol can introduce various functional groups on the surface of the particles. Therefore, when the surface-treated dispersing component is used in the thermosetting composition of the present invention, the surface-treated dispersing component easily bonds with organic components such as the epoxy group-containing modified polyester polymer of ingredient (A) and the blocked carboxyl group-containing compound of ingredient (B). Thus, in such case that the ceramic ingredient chemically bonds with the organic component, the crosslinking of the paint film is tighter than that without chemical bonds so that it is possible to give the paint film having high hardness and excellent elasticity.

The silane coupling agents include vinyltrimethoxysilane, vinyltriethoxysilane, γ-methacryloyloxypropyltrimethoxysilane, γ-glycidoxypropyltrimethoxysilane, γ-aminopropyltrimethoxysilane methyltrimethoxysilane, methyltriethoxysilane and dimethyldimethoxysilane. The silane coupling agent is preferably methyltrimethoxysilane, dimethyldimethoxysilane, γ-glycidoxypropyltrimethoxysilane and γ-methacryloyloxypropyltrimethoxysilane, more preferably methyltrimethoxysilane and dimethyldimethoxysilane. Examples of commercial silane coupling agents are A-162, A-163 and AZ-6122 (each trade name, a product of NIPPON UNICAR CO., L.T.D.). The silane coupling agents may be utilized singly or in combination of two or more members. When the dispersing component of the inorganic oxide sol is surface-treated with the silane coupling agent, the amount of the silane coupling agent is preferably 1 to 40 percent by weight, more preferably 5 to 30 percent by weight based on the nonvolatile matter of the inorganic oxide sol.

The dispersing component of the inorganic oxide sol surface-treated with the silane coupling agent is preferably a dispersing component of the inorganic oxide sol dispersed in an azeotropic solvent which is produced by dehydrating water contained in an aqueous inorganic oxide sol by means of azeotropic distillation with the azeotropic solvent to water and then surface-treating the dispersing component with the silane coupling agent. More preferable dispersing component of the inorganic oxide sol is a dispersing component of the silica sol. The dispersing component of the inorganic oxide sol produced by the preparation method improves hardness, elasticity, stain resistance and weathering resistance of the obtained paint film. Further, a coating composition having high nonvolatile matter can be easily obtained because it is possible to increase the concentration of the inorganic oxide sol. Therefore, it is possible to select a thinner for controlling the viscosity of the coating composition from various thinners in broad selection width and to increase the thickness of the paint film in coating.

The azeotropic solvents include a water-soluble alcohol, a water-soluble carboxylic acid ester and a water-soluble cyclic ether.

The water-soluble alcohols include ethanol, n-propylalcohol, i-propylalcohol, n-butylalcohol, i-butylalcohol, sec-butylalcohol, t-butylalcohol, methylcellosolve, ethylcellosolve ethyleneglycolmonomethylether, ethyleneglycolmonoethylether ethyleneglycolmono n-propylether, ethyleneglycolmonobutylether diethyleneglycolmonomethylether, diethyleneglycolmonoethylether diethyleneglycolmonobutylether, 3-methyl-3-methoxybutanol propyleneglycolmonomethylether, ethyleneglycol and propyleneglycol.

The water-soluble carboxylic acid esters include methylacetate and ethylacetate. The water-soluble cyclic ethers include 1,4-dioxane.

The azeotropic solvents may be utilized singly or in combination of two or more members.

A water-insoluble solvent also can be used together with the water-soluble solvent as a mediator in order to improve the efficiency of dehydration by azeotropic distillation. The water-insoluble solvents include benzene, xylene, toluene, cyclohexanone, diphenylether and dibutylether. The water-insoluble solvent may be utilized singly or in combination of two or more members. The amount of the water-insoluble solvent is limited in the range in which the sol is not flocculated and generally preferably 1 to 10 percent by weight, though the amount is different according to the kind of the water-insoluble solvents.

The dehydration by azeotropic distillation is preferably proceeded with the dropping of azeotropic solvent. The dehydration by azeotropic distillation is proceeded in the range of preferably 30 to 100° C., more preferably 40 to 80° C. The dehydration by azeotropic distillation can be proceeded under reduced pressure or atmosphere, preferably under reduced pressure. The water content of the inorganic oxide sol dispersed in the azeotropic solvent after the dehydration by azeotropic distillation is generally preferably not more than 2 percent by weight, more preferably not more than 1 percent by weight. The concentration of the dispersing component of the inorganic oxide sol dispersed in the azeotropic solvent after dehydration by azeotropic distillation is preferably not more than 55 percent by weight, more preferably 25 to 55 percent by weight as nonvolatile content.

The surface-treatment with the silane coupling agent can be proceeded by mixing the silane coupling agent with the dispersing component of the inorganic oxide sol dispersed in the azeotropic solvent after the dehydration by azeotropic distillation. The temperature of surface-treatment with the silane coupling agent is particularly not limited, preferably 20 to 100° C., more preferably 30 to 90° C., furthermore 40 to 80° C.

The water content of the inorganic oxide sol dispersed in the azeotropic solvent after the surface-treatment with the silane coupling agent is generally preferably not more than 1 percent by weight, more preferably not more than 0.5 percent by weight.

The solvent of inorganic oxide sol dispersed in the azeotropic solvent can be substituted with the desired solvent according to the need. Particularly, when the alcohol described above is used as the azeotropic solvent, the alcohol is more preferably substituted with other solvent. The solvents used in solvent substitution include acetone, methylethylketone, methylisobutylketone, cyclohexanone, methyl acetate, ethyl acetate and 1,4-dioxane. The solvent substitution is proceeded in the range of preferably 30 to 120° C., more preferably 40 to 110° C., though it is influenced by the kind of the solvents.

The average particle diameter of the dispersing component of inorganic oxide sol is preferably not more than 100 nm, more preferably not more than 50 nm. When the average particle diameter is more than 100 nm, transparency of a clear film decreases and the stain resistance of the paint film decreases.

In the thermosetting composition of the present invention, the dispersing components of inorganic oxide sol may be utilized singly or in combination of two or more members. The amount of the nonvolatile matter of the dispersing component of inorganic oxide sol is selected to be 5 to 60 percent by weight based on the total nonvolatile matter of ingredient (A), ingredient (B) and ingredient (D). When the amount of the nonvolatile matter of the dispersing component of inorganic oxide sol is less than 5 percent by weight to the total nonvolatile matter, the effect of addition of the dispersing component of inorganic oxide sol is not sufficiently obtained and the improvement effect on the hardness of the paint film is not sufficiently obtained. When the amount of the nonvolatile matter of the dispersing component of inorganic oxide sol is more than 60 percent by weight to the total nonvolatile matter, the trend of the decrease in the flexibility and the elasticity of the paint film is observed. The amount of the nonvolatile matter of the dispersing component of inorganic oxide sol is preferably 5 to 40 percent by weight against the total nonvolatile matter, in view of the balance of the hardness, stain resistance, weathering resistance, flexibility and elasticity of the paint film.

The curing temperature and time required to cure the thermosetting compositions of the present invention are different according to the temperature at which the free carboxyl groups are generated from the blocked functional groups represented by formula (1) and the kind of the acid catalysts. The curing is generally completed at a temperature of 50 to 300° C. for 5 seconds to 1 hours.

The thermosetting composition may be formulated without other ingredients or with various additives such as coloring pigments, fillers, solvents, ultraviolet light absorbents, antioxidants and flow controlling agent, and can be utilized in various uses applying the curing ability such as coating compositions, ink, adhesives and molded articles.

The thermosetting composition is prepared by compounding the above ingredients and, according to needs, various additives. The addition method of the ingredients and the additives is not limited and is conducted by various methods and the mixing order and the addition order are also conducted by various methods.

The thermosetting composition of the present invention can be used as coating compositions which is utilized in the process for preparing articles having a single layer paint film of a top coat or plural layers paint films comprising a colored base coat film and a clear top coat film. The thermosetting composition of the present invention is very important in the fields of industrial coating such as coating compositions for automobile, railway vehicles, metal articles of precoat or postcoat, electric instruments, steel structures, machines and building materials, and further coating compositions for insulating, moistureproofing or rustproofing electron or electric parts and coating compositions in the other industrial coating field.

In the coating compositions, the pigment is preferably formulated in the amount of 0 to 300 parts by weight, more preferably 0 to 150 parts by weight based on 100 parts by weight of the total weight of the nonvolatile matter of ingredient (A) and (B) in the thermosetting composition.

The pigments include various pigments of organic pigments and inorganic pigments. Examples of the pigments include surface treated metallic pigments such as aluminium, copper, brass, bronze, stainless steel, iron oxides of mica form, metallic powders of flake form and mica coated with titanium dioxide or iron oxides; inorganic pigments such as titanium dioxide, iron oxides, yellow iron oxide and carbon black; organic pigments such as phthalocyanine blue, phthalocyanine green and quinacridone red pigments; extender pigments such as precipitated barium sulfate, clay, silica and talc.

It is possible to obtain excellent appearance of the finishing in coating by applying the thermosetting composition of the present invention to the process for preparing articles having plural layers paint films comprising a colored base coat film and a clear top coat film.

The film forming composition of the base coat film comprises a resin binder and a pigment. The resin binder includes various binders such as a conventional acrylic resin, a polyester resin (containing an alkyd resin), a polyurethane resin and melamine resin.

The film forming composition of the base coat film can comprise at least one of conventional various additives such as a surface active agent, an ultraviolet absorbent, a leveling agent, a thixotropic agent, a filler, a defoaming agent, an organic solvent and a catalyst. The film forming composition of the clear top coat film is the thermosetting composition of the present invention and may be added with the pigments described above, various additives or dyes having excellent weathering resistance, according to the needs and within the limits of transparency.

The kind of the substrate to which the coating compositions are applied is not particularly limited, and various kinds of organic or inorganic substrate materials, such as woods, glasses, metals, fabrics, plastics, foamed articles, elastomers, papers, ceramics, concretes and gypsum boards, may be utilized.

The suitable methods of coating for using the coating composition comprising the thermosetting composition of the present invention are a method which comprises controlling the desired viscosity by heating the coating composition or adding organic solvents or reactive diluents according to the needs, and followed coating composition on the substrate by conventional coating machines such as air spray, electrostatic air spray, roll coater, flow coater, and dip type coating machine, brush, bar coater or applicator in an amount to form a film having dried thickness of 0.5 to 300 $\mu$m and then curing, in general, in the condition of 50 to 300° C. for 5 seconds to 1 hour, and a method which comprises, in the case of two coat one bake coating, diluting the base coat composition with suitable solvents such as organic solvents to control the desirable viscosity, coating the base coat composition on the substrate by the above method in an amount to form a film having dried thickness of 5 to 40 $\mu$m, preferable 7 to 35 μm, allowing to stand at room temperature to 100° C. for 1 to 20 minutes, followed applying the clear top coat composition of the thermosetting composition of the present invention on the base coat by the above method in an amount to form a film having dried thickness of 10 to 100 μm, preferable 10 to 60 μm and then curing, in general, in the condition of 50 to 300° C. for 5 seconds to 1 hour. Preferable method of the application is the application in the two coat one bake coating method by an air spray.

The thermosetting compositions of the invention can be applied to coating on the metal plates.

The method of application of coating on the metal plate includes a method which comprises applying optionally the under coating composition on the metal plate and curing, and further optionally the intermediate coating composition on the under coat and curing, and applying the top coating compositions comprising the pigment in the range from 0 to 300 parts by weight based on the 100 parts by weight of the total nonvolatile matter of ingredient (A) and (B) in the thermosetting composition of the present invention on the coat layers and curing by heating.

The metal plates includes various metal plates such as cold rolled steel plates, zinc-coated steel plates such as electroplating zinc-coated steel plates, electroplating zinc alloy coated steel plates, hot-dip zinc-coated steel plates (non alloyed), zinc-iron plates, hot-dip zinc-coated steel plates (alloyed), hot-dip zinc aluminium alloy-coated steel plates, stainless steel plates, aluminium plates and aluminium alloy plate.

In applying the under coating composition to the metal plate, it is better to pretreat the surface of the metal plate. The pretreatment includes conventional various pretreatments as pretreatment for precoat metal plate such as chromate chemical treatment, phosphoric acid chemical treatment and complex oxgenated film treatment.

As the under coating composition and the intermediate coating composition, it is possible to use coating compositions which are generally utilized as conventional under coating compositions and intermediate coating compositions. The under coat layer and intermediate coat layer are cured in every application of the coatings. The curing condition is generally 100 to 300° C. for 5 seconds to 5 minutes. In the field of precoating in which the application is for example conducted by coil coating, the curing are generally preferably conducted in the condition of 120 to 260° C. of maximum temperature of coated materials for 15 to 120 seconds.

The top coating composition described above comprises the pigment in the range from 0 to 300 parts by weight, preferably 0 to 180 parts by weight, based on the 100 parts by weight of the total nonvolatile matter of ingredient (A ) and (B ) in the thermosetting compositon of the present invention.

The methods of application of under coating composition intermediate coating composition and top coating composition can be conducted by various methods, but are preferably methods by roll coater, flow coater or spray. In the case of applying the top coating composition by roll coater, natural method and reverse method can be used, but it is preferable to use the reverse method, because an excellent smoothing surface of the coated film is obtained in the reverse method.

Thickness of the coated film is not particularly limited but can be generally in the range from each 3 to 25 μm of under coat layer and intermediate coat layer and 3 to 50 μm of top coat layer. When the precoated steel plate is produced with conventional top coating compositions in an amount to form a film having dried thickness of not less than 20 μm, defects such as pinholes in the cured film are often caused. However, the top coating compositions of the present invention can inhibit the pinholes in such case that the thickness is increased to more than 20 μm.

The coated film applied with top coating composition is cured by heating. The curing by heating is generally conducted in condition of 100 to 300° C. for 5 seconds to 5 minutes, preferably 120 to 280° C., more preferably 160 to 260° C. of maximum temperature of coated materials, preferably for 15 to 120 seconds, more preferably 15 to 90 seconds. Also, The coated film can be cured in the condition of 210 to 250° C. of maximum temperature of coated materials in the short time of 10 to 15 seconds. By the heat curing, the coated metal plate having excellent properties of the cured film and finishing appearance can be obtained.

Coated articles prepared by the coating composition comprising the thermosetting composition of the invention include structures, wood articles, metallic articles, plastics articles, rubber articles, finished papers, ceramic articles and glass articles, specifically automobiles, metal plates such as steel plates, motorcycles, marine vessels, railway vehicles, airplanes, furnitures, musical instruments, house-hold electric instruments, building materials, vessels, office articles, sport articles and toys.

EXAMPLES

The invention is explained in detail with reference to the following examples; however, these examples are not to be construed to limit the scope of the invention.

Preparation Example 1
Synthesis of a polyester resin (solution)

Into a four-necked flask which is equipped with a thermometer, a Dean-Stark (a fractionating column for removing water and the like in a condensation reaction of a polyester synthesis), a reflux condenser, a tube for introducing nitrogen gas and a stirrer, 367 parts by weight of dimethyl terephthalate, 179 parts by weight of 1,6-hexanediol, 141 parts by weight of ethyleneglycol, 314 parts by weight of isophthalic acid, 5 parts by weight of dibutyl tin dilaurate and 50 parts by weight of xylene were charged. The polycondensation reaction was conducted while stirring and increasing the temperature from 170° C. to 240° C. And then, 757 parts by weight of xylene were added into the solution, so that a solution of the polyester resin having a nonvolatile matter of 50 percent by weight, a resin acid value of 5.3 and a number average molecular weight of 6,600 was obtained. The condition for measuring the amount of the nonvolatile matter is 50° C. and 3 hours under 1 mmHg.

Preparation Example 2
Synthesis of a polyester resin (solution)

Into a four-necked flask which is equipped with a thermometer, a Dean • Stark, a reflux condenser, a tube for introducing nitrogen gas and a stirrer, 463 parts by weight of isophthalic acid and 590 parts by weight of 1,5-pentanediol were charged. The polycondensation reaction was conducted to be the acid value of not more than 5 while stirring and increasing the temperature from 170° C to 240° C. Further, 447 parts by weight of phthalic anhydride was charged into the reaction solution and the addition reaction and the polycondensation reaction were conducted with stirring and increasing the temperature from 140° C. to 240° C. while the pressure was decreased. And then, 350 parts by weight of xylene were added in the solution, so that a solution of the polyester resin having a nonvolatile matter of 80 percent by weight, a resin acid value of 12.6 and a number average molecular weight of 5,600 was obtained. The condition for measuring the amount of the nonvolatile matter is 50° C. and 3 hours under 1 mmHg.

Preparation Example 3
Synthesis of a polyester resin (solution)

Into a four-necked flask which is equipped with a thermometer, a Dean • Stark, a reflux condenser, a tube for introducing nitrogen gas and a stirrer, 24 parts by weight of isophthalic acid, 14 parts by weight of adipic acid, 33 parts by weight of neopentylglycol and 7 parts by weight of xylene were charged. The polycondensation reaction was conducted while stirring and increasing the temperature from 170° C. to 240° C. The acid value of the mixture was measured. When the acid value became 8 or less, 37 parts by weight of xylene were added in the solution, so that a solution of the polyester resin having a nonvolatile matter of 62 percent by weight, a resin acid value of 12.9 and a number average molecular weight of 2,100 was obtained. The condition for measuring the amount of the nonvolatile matter is 50° C. and 3 hours under 1 mmHg.

Preparation Example 4
Synthesis of a polyester resin (solution)

Into a four-necked flask which is equipped with a thermometer, a Dean • Stark, a reflux condenser, a tube for introducing nitrogen gas and a stirrer, 24 parts by weight of isophthalic acid, 14 parts by weight of adipic acid, 23 parts by weight of neopentylglycol, 7 parts by weight of trimethylolpropane and 5 parts by weight of xylene were charged. The polycondensation reaction was conducted while stirring and increasing the temperature from 170° C. to 240° C. The acid value of the mixture was measured. When the acid value became 8 or less, 37 parts by weight of xylene were added in the solution, so that a solution of the polyester resin having a nonvolatile matter of 61 percent by weight, a resin acid value of 12.5 and a number average molecular weight of 2,300 was obtained. The condition for measuring the amount of the nonvolatile matter is 50° C. and 3 hours under 1 mmHg.

Preparation Examples 5 through 13
Synthesis of an epoxy group-containing modified polyester polymer of ingredient (A)

Into a four-necked flask which is equipped with a thermometer, a reflux condenser, a stirrer and a dropping funnel, the solvents for initial charge and the polyester resins or the solution shown in Table 1 and Table 2 were charged. The mixture became a solution by heating and was kept at 120° C. And then, the mixture (dropping component) of the monomers and the polymerization initiators in the composition ratio shown in Table 1 and Table 2 were dropped into the solution at uniform speed from the dropping funnel for 2 hours while keeping the temperature of 120° C. After completing the dropping, the temperature was kept at 120° C. for 1 hour and then the temperature was decreased up to 100° C. The solution of the polymerization initiators (additional catalyst) in the composition ratio shown in Table 1 and Table 2 were added and the mixture was kept at 100° C. for 2 hours. The reaction was completed and the epoxy group-containing modified polyester polymer having the characteristics shown in Table 1 and Table 2 was obtained.

As shown in Table 1 and Table 2, it is found that the epoxy group-containing modified polyester polymers of the present invention became the transparent solution or the stable dispersion liquid and existed stably after allowing to stand for 1 month at 50° C. The cast films, which were obtained by flow coating the epoxy group-containing modified polyester polymers on a transparent glass plate, had good transparency.

TABLE 1

| Preparation Example | | | 5 | 6 | 7 | 8 | 9 |
|---|---|---|---|---|---|---|---|
| Kind of the epoxy group-containing modified polyester (A) polymer | | | A-1 | A-2 | A-3 | A-4 | A-5 |
| Xylene (parts by weight) | | | 40.0 | 40.0 | 40.0 | 40.0 | 40.0 |
| cyclohexanone (parts by weight) | | | — | 37.5 | 18.75 | 25.0 | 25.0 |
| (a) (parts by weight) | Polyester resin or the solution | | solution of Pre. Ex. 1 100 | solution of Pre. Ex. 2 62.5 | solution of Pre. Ex. 2 31.25 | GK•V 150 25.0 | GK•150 25.0 |
| dropping component (parts by weight) | (b) | GMA | 28.4 | 28.4 | 14.2 | 14.2 | 14.2 |
| | (c) | HEMA | — | — | 20.0 | — | 15.0 |
| | | BMA | 10.0 | 10.0 | — | 10.0 | 2.5 |
| | | MMA | — | — | — | 13.85 | 2.5 |
| | | EHA | 11.6 | 11.6 | 15.8 | 11.95 | 15.8 |
| | catalyst | BPL | 1.0 | 1.0 | 1.0 | 1.0 | 1.0 |
| additional catalyst (parts by weight) | | AIBN | 0.5 | 0.5 | 0.5 | 0.5 | 0.5 |
| | | cyclohexanone | 8.5 | 8.5 | 8.5 | 8.5 | 8.5 |
| Equivalent ratio of carboxyl group of component (a) to epoxy group of component (b) | | | 0.0236 | 0.0561 | 0.0561 | 0.0267 | 0.0267 |
| (a)/{(b) + (c)} | | | 50/50 | 50/50 | 33.3/66.7 | 33.3/66.7 | 33.3/66.7 |
| Characteristics | appearance | | colorless liquid | colorless liquid | colorless liquid | milky white dispersion liquid | milky white dispersion liquid |
| | nonvolatile matter (wt %) | | 50.0 | 50.1 | 49.8 | 50.1 | 49.9 |
| | epoxy equivalent (g/mol) | | 525 | 531 | 770 | 775 | 781 |
| | initial viscosity (poise) | | 854.5 | 55.1 | 36.3 | 631.2 | 735.0 |
| | viscosity after storage (poise) | | 1025.4 | 69.4 | 47.1 | 757.4 | 896.7 |

TABLE 1-continued

| Preparation Example | | 5 | 6 | 7 | 8 | 9 |
|---|---|---|---|---|---|---|
| | transparency of cast film | good | good | good | good | good |
| | storage stability | non abnormal | non abnormal | non abnormal | non abnormal | non abnormal |

TABLE 2

| Preparation Example | | | 10 | 11 | 12 | 13 |
|---|---|---|---|---|---|---|
| Kind of the epoxy group-containing modified polyester (A) polymer | | | A-6 | A-7 | A-8 | A-9 |
| Xylene (parts by weight) | | | 40.0 | 40.0 | 40.0 | 40.0 |
| cyclohexanone (parts by weight) | | | 25.0 | 3.0 | 1.1 | 1.0 |
| (a) (parts by weight) | Polyester resin or the solution | | GK•150 25.0 | GK•150 3.0 | solution of Pre. Ex. 3 4.2 | solution of Pre. Ex. 4 4.3 |
| dropping component (parts by weight) | (b) | GMA | 28.4 | 28.4 | 14.2 | 14.2 |
| | (c) | HEMA | — | — | — | — |
| | | BMA | 10.0 | 10.0 | 10.0 | 10.0 |
| | | MMA | — | 11.6 | 7.5 | 7.5 |
| | | EHA | 11.6 | — | 18.3 | 18.3 |
| | catalyst | BPL | 1.0 | 1.0 | 1.0 | 1.0 |
| additional catalyst (parts by weight) | | AIBN | 0.5 | 0.5 | 0.5 | 0.5 |
| | | cyclohexanone | 8.5 | 8.5 | 8.5 | 8.5 |
| Equivalent ratio of carboxyl group of component (a) to epoxy group of component (b) | | | 0.0134 | 0.0016 | 0.0060 | 0.0058 |
| (a)/{(b) + (c)} | | | 33.3/66.7 | 5.7/94.3 | 4.9/95.1 | 5.0/95.0 |
| Characteristics | appearance | | milky white dispersion liquid | milky white dispersion liquid | colorless liquid | colorless liquid |
| | nonvolatile matter (wt %) | | 50.0 | 49.9 | 49.9 | 50.1 |
| | epoxy equivalent (g/mol) | | 385 | 285 | 535 | 537 |
| | initial viscosity (poise) | | 671.3 | 5.7 | 5.4 | 7.2 |
| | viscosity after storage (poise) | | 872.7 | 6.0 | 5.8 | 7.5 |
| | transparency of cast film | | good | good | good | good |
| | storage stability | | non abnormal | non abnormal | non abnormal | non abnormal |

1) The abbreviations in Tables are as follows.
GMA: glycidyl methacrylate
HEMA: 2-hydroxyethyl methacrylate
BMA: n-butyl methacrylate
MMA: methyl methacrylate
EHA: 2-ethylhexyl acrylate
BPL: t-butyl peroxy laurate
AIBN: 2,2'-azobisisobutyronitrile
Vylon GK-150: polyester resin produced by TOYOBO CO., LTD., resin acid value 6.0, number average molecular weight 12,000, solid at room temperature
2) appearance: The appearance of the epoxy group-containing modified polyester polymer by visual was shown.
3) nonvolatile matter: The residue was measured after drying for 3 hours at 50° C. under 0.1 mmHg.
4) epoxy equivalent: After the open-ring reaction of epoxy groups was conducted in excess 0.2 N dioxane solution of hydrochloric acid, the unreacted hydrochloric acid was titrated reversely with 0.1 N ethanol solution of KOH. The epoxy equivalent per the resin was calculated.
5) viscosity: The viscosity was measured at 20° C by the method of the rotary viscometer according to Japanese Industrial Standard K -5400 (1990) 4.5.3. The viscosity after storage was the viscosity measured by using the sample after storage stability test.
6) Transparency of cast film: After the epoxy group-containing modified polyester polymer was flow coated on a glass plate and the solvent was vaporized in the condition of 30 minutes at 140° C., the appearance was measured by visual.
7) storage stability: After the solution or the dispersion liquid of the epoxy group-containing modified polyester polymer was allowed to stand in a thermostat for 1 month at 50° C. The abnormal situation such as separation and gelation of the resin was observed.

Preparation Comparative Examples 1 and 2

Synthesis of an epoxy group-containing acrylic resin (solution)

Into a four-necked flask which is equipped with a thermometer, a reflux condenser, a stirrer and a dropping funnel, 40 parts by weight of the solvents for initial charge was charged and heated with stirring to keep the temperature of 100° C. And then, the mixture (dropping component) of the monomers, the polymerization initiators and the solvents in the composition ratio shown in Table 3 were dropped into the solvent at uniform speed from the dropping funnel for 2 hours while keeping the temperature of 100° C. After finishing the dropping, the temperature was kept at 100° C. for 1 hour. The solution of the polymerization initiators (additional catalyst) in the composition ratio shown in Table 3 were added and the mixture was kept at 100° C. for 2 hours. The reaction was completed and the acrylic resin shown in Table 3 was obtained.

TABLE 3

| Preparation Comparative Example | | | 1 | 2 |
|---|---|---|---|---|
| initial charged solvent (parts by weight) | xylene | | 40.0 | — |
| | cyclohexanone | | — | 40.0 |
| dropping component (parts by weight) | (b) | GMA | 28.4 | 28.4 |
| | (c) | HEMA | — | 30.0 |
| | | BMA | 20.0 | 5.0 |
| | | MMA | 27.7 | 5.0 |
| | | EHA | 23.9 | 31.6 |
| | catalyst | AIBN | 2.0 | 2.0 |
| | solvent | n-butyl acetate | 54.0 | — |
| | | cyclohexanone | — | 54.0 |
| additional catalyst (parts by weight) | | AIBN | 0.2 | 0.2 |
| | | n-butyl acetate | 3.8 | — |
| | | cyclohexanone | — | 3.8 |
| characteristics | | nonvolatile matter (wt %) | 50.0 | 50.0 |
| | | epoxy equivalent of resin (g/mol) | 503 | 511 |
| | | viscosity (poise) | 8.5 | 10.2 |

1 ) The abbreviations in the Table are as follows.
GMA: glycidyl methacrylate
HEMA: 2hydroxyethyl methacrylate
BMA: n-butyl methacrylate
MMA: methyl methacrylate
EHA: 2 ethylhexyl acrylate
AIBN: 2,2'-azobisisobutyronitrile
2) nonvolatile matter: The residue was measured after drying for 3 hours at 50° C. under 0.1 mmHg.
3) epoxy equivalent: After the open-ring reaction of epoxy groups was conducted in excess 0.2 N dioxane solution of hydrochloric acid, the unreacted hydrochloric acid was titrated reversely with 0.1 N ethanol solution of KOH. The epoxy equivalent per the resin was calculated.
4) viscosity: The viscosity was measured at 20° C. by the method of the rotary viscometer according to Japanese Industrial Standard K-5400 (1990) 4.5.3.

Preparation Example 14
Preparation of compound B-1 of ingredient (B)
(1) Preparation of the polycarboxylic acid compound B'-1
Into a four-necked flask equipped with a thermometer, a reflux condenser, a stirrer and a dropping funnel, the following components were charged and the mixture was heated under stirring until the temperature reached to 120° C.

pentaerythritol 136.0 parts by weight
methyl isobutyl ketone 538.7 parts by weight To the mixture kept at 120° C., 672.0 parts by weight of methyl-hexahydrophthalic anhydride was added by dropping for 2 hours and the mixture was kept stirring under heating until acid value of the mixture decreased to a value not more than 170. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, the solution of a tetrafunctional polycarboxylic acid compound B'-1 having the characteristics shown in Table 4 was prepared.
(2) Preparation of compound B-1
Into a flask of the same kind as the above, a mixture of the following composition including the solution of the polycarboxylic acid compound prepared above was charged and kept stirring at 50 CC.

| the solution of polycarboxylic acid compound of (1) | 336.7 |
|---|---|
| isobutyl vinyl ether | 120.2 |
| hydrochloric acid, 35 weight % | 0.2 |
| methyl isobutyl ketone | 46.3 |

(quantity in parts by weight)

The reaction was completed when acid value of the mixture decreased to a value of not more than 12 and the mixture was transferred to a separation funnel after cooling by standing. The reaction mixture was washed with 100 parts by weight of alkaline water containing 10 weight % of sodium bicarbonate in the funnel and then washed with 300 parts by weight of deionized water repeatedly until pH of the washing water became below 7. The organic layer was dried by adding Molecular Sieves® 4A1/16 and standing for 3 days at the room temperature. The solution of compound B-1 having the characteristics shown in Table 4 was obtained.

TABLE 4

| Preparation Example | | 14 |
|---|---|---|
| kind of compound (B) | | B-1 |
| Characteristics of polycarboxylic acid B'-1 | average number of functional group | 4 |
| | resin acid equivalent (g/mol) | 202 |
| Blocking agent | | isobutyl vinyl ether |
| Characteristics of B-1 | average number of functional group | 4 |
| | nonvolatile matter (wt %) | 60.0 |
| | gardner viscosity | E–F |

Note

Nonvolatile matter: The residue was measured after drying for 3 hours at 50° C. under 0.1 mmHg.

Gardener viscosity (25° C.) was measured by a Gardener viscometer according to Japanese Industrial Standard K 5400 (1990) 4.5.1.

Preparation of compound B-2 of ingredient (B)

Preparation Example 15
Preparation of a vinyl monomer

Into a four-necked flask equipped with a thermometer, a reflux condenser and a stirrer, a mixture of the component shown in Table 5 was charged and kept stirring at 50° C. The reaction was completed when acid value of the mixture decreased to a value of not more than 30 and the mixture was transferred to a separation funnel after cooling by standing. The reaction mixture was washed with 100 parts by weight of alkaline water containing 10 weight % of sodium bicarbonate in the funnel and then washed with 200 parts by weight of deionized water repeatedly until pH of the washing water became below 7. The organic layer was dried by adding Molecular Sieves® 4A1/16 (a product of Wako Pure Chemical Industries Co., Ltd.) and standing for 3 days at the room temperature. The vinyl monomer of Preparation Example 10 having the effective component content shown in Table 5 was obtained.

TABLE 5

| Preparation Example | | 15 |
|---|---|---|
| raw material composition (parts by weight) | methacrylic acid | 86.0 |
| | ethyl vinyl ether | 86.5 |
| | hydrochloric acid of 35 wt % | 0.1 |
| effective component content (wt %) | | 94.5 |

Note

Effective component content was measured by gas chromatography.

Preparation Example 16
Preparation of the solution of the compound B-2

Into a four-necked flask which is equipped with a thermometer, a reflux condenser, a stirrer and a dropping funnel, 200 parts by weight of solvent for initial charge (xylene) was charged and heated under stirring and kept at the temperature of 80° C. And then, the mixture (dropping component) of the monomers and the polymerization initiators in the composition ratio shown in Table 6 were dropped into the solution at uniform speed from the dropping funnel for 2 hours while keeping the temperature of 80° C. After finishing the dropping, the temperature was kept at 80° C. for 1 hour. The solution of the polymerization initiators (additional catalyst) in the composition ratio shown in Table 6 were added and the mixture was kept at 80° C. for 4 hours. The reaction was completed and the solution of compound B-2 having the characteristics shown in Table 6 was obtained.

TABLE 6

| Preparation Example | | 16 |
|---|---|---|
| kind of compound (B) | | B-2 |
| xylene (parts by weight) | | 200.0 |
| dropping component (parts by weight) | vinyl monomer of Preparation Example 15 | 167.2 |
| | n-butyl methacrylate | 100.0 |
| | methyl methacrylate | 178.6 |
| | 2-ethylhexyl acrylate | 135.4 |
| | n-butyl acetate | 135.9 |
| | 2,2'-azobisisobutyronitrile | 22.9 |
| additional catalyst (parts by weight) | n-butyl acetate | 57.0 |
| | 2,2'-azobisisobutyronitrile | 3.0 |
| characteristics | nonvolatile matter (wt %) | 57.2 |
| | viscosity (25° C.) | R–S |

Note

Nonvolatile matter: The residue was measured after drying for 3 hours at 50° C. under 0.1 mmHg.

Gardener viscosity was measured by a Gardener viscometer according to Japanese Industrial Standard K 5400 (1990) 4.5.1.

Preparation of thermal latent acid catalysts of ingredient (C)

Preparation Example 17
Preparation of thermal latent acid catalyst C-1

Zinc octanoate as Lewis acid and triethyl phosphate as Lewis base shown in Table 7 were stirred at 50° C. until the mixture was uniformed, so that thermal latent acid catalyst C-1 shown in Table 7 was obtained.

Preparation Example 18
Preparation of thermal latent acid catalyst C-2

Into a four-necked flask which is equipped with a thermometer, a reflux condenser, a stirrer and a dropping funnel, a epoxy group-containing compound of component (I) and Lewis acid of component (III) shown in Table 7 were charged and stirred at room temperature. And then, a sulfur atom-containing compound of component (II) shown in Table 7 was dropped into the mixture and the mixture was stirred for 2 hours at 70° C. The mixture was cooled by standing. And when the temperature of the mixture was decreased until room temperature, a carboxylic acid and a carboxylic anhydride compound of component (IV) shown in Table 7 were added into the mixture. The mixture was stirred for 1 hour at room temperature and the solution of thermal latent acid catalyst C-2 shown in Table 7 was obtained.

TABLE 7

| Preparation Example | | | 17 | 18 |
|---|---|---|---|---|
| kind of thermal latent acid catalyst (C) | | | C-1 | C-2 |
| compositon ratio (parts by weight) | Lewis acid | zinc octanoate | 100.0 | — |
| | Lewis base | triethyl phosphate | 103.6 | — |
| | component (I) | cyclohexene oxide | — | 31.6 |
| | component (II) | di-n-hexylsulfide | — | 30.9 |
| | component (III) | methylethyl ketone solution containing 20.9 wt % of zinc chloride | — | 100.0 |
| | component (IV) | 2-ehtylhexyl acid | — | 17.6 |
| | | propionic anhydride | — | 4.0 |
| solution concentration (weight %) | | | 100.0 | 57.0 |

Preparation Example 19
Preparation of compound D-1 of a dispersing component treated with a silane coupling agent of an inorganic oxide sol of ingredient (D)

Into a reaction vessel equipped with a stirrer, a thermometer, a reflux condenser having a Dean • Stark trap and a dropping funnel, 1000 parts by weight of SNOWTEX MIBK-ST (a product of Nissan Chemical Industries, Ltd., a dispersing component of silica sol (average particle diameter: 30 nm), non-volatile matter: 30 percent by weight, solvent: methylisobutylketone) and 40 parts by weight of A-163 (a product of Nippon Unicar Co., Ltd., a silane coupling agent) were charged and the mixture was heated and kept at 80° C. for 8 hours. The resultant silica sol surface-treated with a silane coupling agent was obtained in 1020 parts by weight. The average particle diameter of the dispersing component of silica sol is 32 nm.

Examples 1 through 10
Application to two coat one bake metallic color coating.
(1) Preparation of clear coating compositions One component clear coating compositions were prepared by mixing raw materials shown in Table 8 and 9. (2) Preparation of test piece and Evaluation of cured film properties Cationic electrodeposition coat AQUA No.4200® (a product of NOF CORPORATION) was applied by electrodeposition to a soft steel plate treated with zinc phosphate in an amount to form a film having dried thickness of 20 $\mu$m and the coated plate was baked at 175° C. for 25 minutes. Intermediate coat EPICO No. 1500CP Sealer® (a product of NOF CORPORATION) was applied to the prepared plate by air spraying in an amount to form a film having dried thickness of 40 $\mu$m and the plate was baked at 140° C. for 30 minutes.

A silver metallic base coating composition, BELCOAT No.6000® (a product of NOF CORPORATION) was applied on the intermediate coat layer by air spraying in 2 stages with an interval of 1 minute 30 seconds in an amount to form a film having dried thickness of 15 $\mu$m. After the coated pieces were set at 20° C. for 3 minutes, a test plate was obtained.

The raw coating compositions prepared in (1) were diluted with thinner (xylene) to a viscosity required for spraying (25 seconds at 20° C. by Ford cup No.4) and applied to the test plates prepared before by air spraying. Test pieces were prepared by curing the coated plate at 140° C. for 30 minutes. In all cases, uniform cured films having good gloss were prepared.

Results of the evaluation of cured film properties are shown in Table 8 and 9.

(2) Impact resistance (1)

By using an shock deformation tester (Japanese Industrial Standard K-5400 (1990), 8.3.2 Du Pont method), a test piece was clamped to an impact frame of 6.35 mm radius and a weight of 500 g was dropped from the height of 40 cm on the test piece. Damage made on the cured film was observed by visual comparison.

TABLE 8

| Example | | 1 | 2 | 3 | 4 | 5 |
|---|---|---|---|---|---|---|
| formulation ratio (parts by weight) | | | | | | |
| (A) | compound A-1 | 100 | — | — | — | — |
| | compound A-2 | — | 100 | — | — | — |
| | compound A-3 | — | — | 150 | — | — |
| | compound A-4 | — | — | — | 150 | — |
| | compound A-5 | — | — | — | — | 150 |
| (B) | compound B-1 | 50 | — | 50 | 50 | 50 |
| | compound B-2 | — | 100 | — | — | — |
| (C) | thermal latent acid catalyst C-1 | 6.0 | — | 8.0 | — | 8.0 |
| | thermal latent acid catalyst C-2 | — | 8.0 | — | 8.0 | — |
| MODAFLOW | | 0.15 | 0.20 | 0.20 | 0.20 | 0.20 |
| properties of paint fime | acid resistance | non abnormal | non abnormal | non abnormal | non abnormal | non abnormal |
| | impact resistance (1) | non abnormal | non abnormal | non abnormal | non abnormal | non abnormal |
| | impact resistance (2) | non abnormal | non abnormal | non abnormal | non abnormal | non abnormal |
| | weathering resistance | 94% | 95% | 94% | 95% | 94% |
| | knoop hardness | 10.5 | 10.3 | 10.2 | 10.5 | 10.3 |
| storage stability 40° C. (poise) | initial viscosity | 1.0 | 1.0 | 1.0 | 1.0 | 1.0 |
| | viscosity after 30 days | 1.4 | 1.2 | 1.4 | 1.2 | 1.4 |

TABLE 9

| Example | | 6 | 7 | 8 | 9 | 10 |
|---|---|---|---|---|---|---|
| formulation ratio (parts by weight) | | | | | | |
| (A) | compound A-6 | 100 | — | — | — | — |
| | compound A-7 | — | 100 | — | — | 100 |
| | compound A-8 | — | — | 100 | — | — |
| | compound A-9 | — | — | — | 100 | — |
| (B) | compound B-1 | 50 | 50 | 50 | 50 | 50 |
| | compound B-2 | — | — | — | — | — |
| (C) | thermal latent acid catalyst C-1 | — | 6.0 | 6.0 | 6.0 | 6.0 |
| | thermal latent acid catalyst C-2 | 6.0 | — | — | — | — |
| (D) | compound D-1 | — | — | — | — | 25 |
| MODAFLOW | | 0.15 | 0.15 | 0.15 | 0.15 | 0.15 |
| properties of paint fime | acid resistance | non abnormal | non abnormal | non abnormal | non abnormal | non abnormal |
| | impact resistance (1) | non abnormal | non abnormal | non abnormal | non abnormal | non abnormal |
| | impact resistance (2) | non abnormal | non abnormal | non abnormal | non abnormal | non abnormal |
| | weathering resistance | 95% | 95% | 96% | 95% | 95% |
| | knoop hardness | 10.2 | 10.2 | 10.8 | 10.5 | 13.5 |
| storage stability at 40° C. (poise) | initial viscosity | 1.0 | 1.0 | 1.0 | 1.0 | 1.0 |
| | viscosity after 30 days | 1.2 | 1.3 | 1.2 | 1.4 | 1.5 |

Note

MODAFLOW®: a product of Monsanto Co., a leveling agent The properties of the cured films was determined according to the following methods.

(1) Acid resistance

On a test piece, 2 ml of 40 weight % sulfuric acid was applied as spots and condition of the cured film was observed by visual comparison after heating for 30 minutes at 60° C.

(3) Impact resistance (2)

According to the test method of impact resistance (1), a weight of 1000 g was dropped from the height of 40 cm on the test piece. Damage made on the cured film was observed by visual comparison.

This test method of impact resistance (2) provides a extreme rigorous judgement compared with impact resistance (1).

(4) Weathering resistance

By using a weathering resistance tester of sunshine carbon arc lamp (Japanese Industrial Standard K-5400 (1990) 9.8.1), a test piece was exposed for 1000 or 3000 hours. The 60 degree spicular gloss of the cured film was measured according to Japanese Industrial Standard K-5400 (1990) 7.6 and compared with that of a cured film which was not exposed.

(5) Knoop hardness

Measurement was made by using M type micro-hardness meter (manufactured by Shimadzu, Co., Ltd.) at 20° C. A larger value shows a higher hardness.

(6) Storage stability

The clear coating compositions prepared in (1) described above were diluted with thinner (xylene) to the viscosity of 1 poise (measured at 20° C. according to a rotary viscometer method of Japanese Industrial Standard K-5400 (1990) 4.5.3) and stored in a sealed condition at 40° C. After the coating compositions were stored for 30 days at 40° C., the viscosity was measured. Results listed in Table 8 and 9 show that one component clear coating compositions comprising the thermosetting composition of the present invention for a two coat one bake metallic color coating provide excellent acid resistance, weathering resistance, hardness and storage stability, and further provide excellent impact resistance in the more rigorous impact resistance test.

Comparative Examples 1 and 2

The epoxy group-containing acrylic resins which were prepared in Preparation Comparative Example 1 and 2 and corresponding to Examples of European Patent Publication No. 643,112, were used instead of ingredient (A). The coating compositions were prepared to be in the formulation shown in Table 10 by the same method as Examples 1 through 10.

By using the obtained coating compositions, the test pieces were prepared by the same method as Example 1 through 10 and the properties tests were conducted. The cured films were excellent in the acid resistance, weathering resistance and knoop hardness, but inferior in the impact resistance (2), as shown in Table 10.

TABLE 10

| formulation ratio (parts by weight) | | Comparative Example 1 | Comparative Example 2 |
|---|---|---|---|
| epoxy group-containing acrylic resin | | Pre. Comp. Ex. 1 100 | Pre. Comp. Ex. 2 100 |
| (B) | Compound B-1 | 50 | 50 |
| (C) | thermal latent acid catalyst C-1 | 6.0 | — |
| | thermal latent acid catalyst C-2 | — | 6.0 |
| MODAFLOW | | 0.15 | 0.15 |
| properties of curde film | acid resistance | non abnormal | non abnormal |
| | impact resistance (1) | non abnormal | non abnormal |
| | impact resistance (2) | cracks | cracks |
| | weathering resistance | 95% | 95% |
| | knoop hardness | 10.4 | 10.4 |

TABLE 10-continued

| formulation ratio (parts by weight) | | Comparative Example 1 | Comparative Example 2 |
|---|---|---|---|
| storage stability at 40° C. (poise) | initial viscosity | 1.0 | 1.0 |
| | viscosity after 30 days | 1.4 | 1.2 |

Comparative Example 3

The nonblocked type polycarboxylic acid compound B'-1 was used instead of ingredient (B) in Comparative Example 3. The clear coating compositions were prepared to be in the formulation shown in Table 11.

The storage stability test were conducted by the same method as Examples 1 through 10. The coating composition was gelled after 10 days in Comparative Example 3 as shown in Table 11, because both of carboxyl groups and epoxy groups were not blocked in the crosslinking reaction between these groups.

TABLE 11

| formulation ratio (parts by weight) | | Comparative Example 3 |
|---|---|---|
| (A) | Compound A-1 | 100 |
| polycarboxylic acid B'-1 | | 50 |
| (C) | thermal latent acid catalyst C-1 | 8.0 |
| MODAFLOW | | 0.15 |
| properties of cured film | acid resistance | non abnormal |
| | impact resistance (1) | non abnormal |
| | impact resistance (2) | non abnormal |
| | weathering resistance | 90% |
| | knoop hardness | 10.5 |
| storage stability at 40° C. (poise) | initial viscosity | 1.0 |
| | viscosity after 30 days | gelation after 10 days |

Examples 11 through 20
Application to one coat solid color
(1) Preparation of coating compositions The materials of the compositions summarized in Table 12 and 13 were mixed and charged into sand mills. The mixtures were dispersed until the particle size was decreased to not more than 10 μm, so that the one component coating compositions were prepared.

(2) Preparation of test piece and Evaluation of cured film properties

Cationic electrodeposition coat AQUA No.4200® (a product of NOF CORPORATION) was applied by electrodeposition to a soft steel plate treated with zinc phosphate in an amount to form a film having dried thickness of 20 μm and the coated plate was baked at 175° C. for 25 minutes. intermediate coat EPICO No.1500CP Sealer® (a product of NOF CORPORATION) was applied to the prepared plate by air spraying in an amount to form a film having dried thickness of 40 μm and the plate was baked at 140° C. for 30 minutes to obtain a test plate.

The raw coating compositions prepared in (1) were diluted with thinner (xylene) to a viscosity required for spraying (25 seconds at 20° C. by Ford cup No. 4) and applied to the test plate prepared before by air spraying in an amount to form a film having dried thickness of 40, i m. Test pieces were prepared by curing the coated pieces at 140° C. for 30 minutes.

In all cases, uniform cured films having good gloss were prepared. Results of the evaluation of cured film properties are shown in Table 12 and 13.

TABLE 12

| Example | | 11 | 12 | 13 | 14 | 15 |
|---|---|---|---|---|---|---|
| formulation ratio (parts by weight) | | | | | | |
| (A) | Compound A-1 | 100 | — | — | — | — |
| | Compound A-2 | — | 100 | — | — | — |
| | Compound A-3 | — | — | 150 | — | — |
| | Compound A-4 | — | — | — | 150 | — |
| | Compound A-5 | — | — | — | — | 150 |
| (B) | Compound B-1 | 50 | — | 50 | 50 | 50 |
| | Compound B-2 | — | 100 | — | — | — |
| (C) | thermal latent acid catalyst C-1 | 6.0 | — | 8.0 | — | 8.0 |
| | thermal latent acid catalyst C-2 | — | 8.0 | — | 8.0 | — |
| taitanium dioxide | | 75 | 100 | 100 | 100 | 100 |
| MODAFLOW | | 0.2 | 0.3 | 0.3 | 0.3 | 0.3 |
| properties of cured film | acid resistance | non abnormal | non abnormal | non abnormal | non abnormal | non abnormal |
| | impact resistance (1) | non abnormal | non abnormal | non abnormal | non abnormal | non abnormal |
| | impact resistance (2) | non abnormal | non abnormal | non abnormal | non abnormal | non abnormal |
| | weathering resistance | 91% | 92% | 91% | 92% | 91% |
| | knoop hardness | 10.4 | 10.3 | 10.2 | 10.4 | 10.3 |
| storage stability at 40° C. (poise) | initial viscosity | 1.0 | 1.0 | 1.0 | 1.0 | 1.0 |
| | viscosity after 30 days | 1.5 | 1.2 | 1.4 | 1.2 | 1.4 |

TABLE 13

| Example | | 16 | 17 | 18 | 19 | 20 |
|---|---|---|---|---|---|---|
| formulation ratio (parts by weight) | | | | | | |
| (A) | Compound A-6 | 100 | — | — | — | — |
| | Compound A-7 | — | 100 | — | — | 100 |
| | Compound A-8 | — | — | 100 | — | — |
| | Compound A-9 | — | — | — | 100 | — |
| (B) | Compound B-1 | 50 | 50 | 50 | 50 | 50 |
| | Compound B-2 | — | — | — | — | — |
| (C) | thermal latent acid catalyst C-1 | — | 6.0 | 6.0 | 6.0 | 6.0 |
| | thermal latent acid catalyst C-2 | 6.0 | — | — | — | — |
| (D) | Compound D-1 | — | — | — | — | 25 |
| taitanium dioxide | | 75 | 75 | 75 | 75 | 75 |
| MODAFLOW | | 0.2 | 0.2 | 0.2 | 0.2 | 0.2 |
| properties of cured film | acid resistance | non abnormal | non abnormal | non abnormal | non abnormal | non abnormal |
| | impact resistance (1) | non abnormal | non abnormal | non abnormal | non abnormal | non abnormal |
| | impact resistance (2) | non abnormal | non abnormal | non abnormal | non abnormal | non abnormal |
| | weathering resistance | 92% | 92% | 91% | 92% | 92% |
| | knoop hardness | 10.2 | 10.5 | 10.4 | 10.5 | 13.4 |
| storage stability at 40° C. (poise) | initial viscosity | 1.0 | 1.0 | 1.0 | 1.0 | 1.0 |
| | viscosity after 30 days | 1.2 | 1.4 | 1.3 | 1.3 | 1.5 |

Note
1) titanium dioxide JR-602®: a product of Teikoku Kako Co., Ltd., titanium dioxide of rutile type The cured film properties and storage stability were determined by the methods described in Table 7.

Comparative Examples 4 and 5

The epoxy group-containing acrylic resins, which were prepared in Preparation Comparative Example 1 and 2, and corresponding to Examples of European Patent Publication No. 643,112, were used instead of ingredient (A). The coating compositions were prepared to be in the formulation shown in Table 14 by the same method as Examples 11 through 20.

By using the obtained coating compositions, the test pieces were prepared by the same method as Example 11 through 20 and the properties tests were conducted. The cured films were excellent in the acid resistance, weathering resistance and knoop hardness, but inferior in the impact resistance (2), as shown in Table 14.

TABLE 14

| formulation ratio (parts by weight) | | Comparative Example 4 | Comparative Example 5 |
|---|---|---|---|
| epoxy group-containing acrylic resin | | Preparation Comparative Example 1 | Preparation Comparative Example 2 |
| | | 100 | 100 |
| (B) | Compound B-1 | 50 | 50 |
| (C) | thermal latent acid catalyst C-1 | 6.0 | — |
| | thermal latent acid catalyst C-2 | — | 6.0 |
| taitanium dioxide | | 75 | 75 |
| MODAFLOW | | 0.2 | 0.2 |
| properties of cured film | acid resistance | non abnormal | non abnormal |
| | impact resistance (1) | non abnormal | non abnormal |
| | impact resistance (2) | cracks | cracks |
| | weathering resistance | 92% | 92% |
| | knoop hardness | 10.4 | 10.4 |
| storage stability at 40° C. | initial viscosity | 1.0 | 1.0 |
| | viscosity after 30 days | 1.5 | 1.2 |

Comparative Example 6

The nonblocked type polycarboxylic acid compound B'-1 was used instead of ingredient (B) in Comparative Example 6. The enamel coating compositions were prepared to be in the formulation shown in Table 15.

The storage stability test were conducted by the same method as Examples 11 through 20. The coating composition was gelled after 10 days in Comparative Example 6 as shown in Table 15, because both of carboxyl groups and epoxy groups were not blocked in the crosslinking reaction between these groups.

TABLE 15

| formulation ratio (parts by weight) | | Comparative Example 6 |
|---|---|---|
| (A) | Compound A-6 | 100 |
| polycarboxylic acid B'-1 | | 50 |
| (C) | thermal latent acid catalyst C-2 | 8.0 |
| taitanium dioxide | | 75 |
| MODAFLOW | | 0.2 |
| properties of cured film | acid resistance | non abnormal |
| | impact resistance (1) | non abnormal |
| | impact resistance (2) | non abnormal |
| | weathering resistance | 90% |
| | knoop hardness | 10.3 |
| storage stability at 40° C. (poise) | initial viscosity | 1.0 |
| | viscosity after 30 days | gelation after 10 days |

Applications to precoat steel plates
(1) Preparation of coating composition

Preparation Example 20 to 29

Synthesis of enamel coating compositions for precoat metal according to the present invention Titanium dioxide was charged into ingredient (A) in a sand mill and dispersed until the particle size was decreased to not more than 10 μm. And then, other raw materials were charged and mixed to be in the formulation shown in Table 16 and 17, so that the one component type enamel coating composition was prepared.

The obtained coating compositions were controlled with SOLVESSO # 150® (a product of Esso Co., aromatic petroleum naphtha) to be the viscosity of 120±10 seconds by Ford cup No.4.

TABLE 16

| Preparation Example | | 20 | 21 | 22 | 23 | 24 |
|---|---|---|---|---|---|---|
| formulation ratio (parts by weight) | | | | | | |
| (A) | Compound A-1 | 100 | — | — | — | — |
| | Compound A-2 | — | 100 | — | — | — |
| | Compound A-3 | — | — | 150 | — | — |
| | Compound A-4 | — | — | — | 150 | — |
| | Compound A-5 | — | — | — | — | 150 |
| (B) | Compound B-1 | 50 | — | 50 | 50 | 50 |
| | Compound B-2 | — | 100 | — | — | — |
| (C) | thermal latent acid catalyst C-1 | 6.0 | — | 8.0 | — | 8.0 |
| | thermal latent acid catalyst C-2 | — | 8.0 | — | 8.0 | — |
| titanium dioxide | | 75 | 100 | 100 | 100 | 100 |
| MODAFLOW | | 0.2 | 0.3 | 0.3 | 0.3 | 0.3 |

TABLE 17

| Preparation Example | | 25 | 26 | 27 | 28 | 29 |
|---|---|---|---|---|---|---|
| formulation ratio (parts by weight) | | | | | | |
| (A) | Compound A-6 | 100 | — | — | — | — |
| | Compound A-7 | — | 100 | — | — | 100 |
| | Compound A-8 | — | — | 100 | — | — |
| | Compound A-9 | — | — | — | 100 | — |
| (B) | Compound B-1 | 50 | 50 | 50 | 50 | 50 |
| | Compound B-2 | — | — | — | — | — |
| (C) | thermal latent acid catalyst C-1 | — | 6.0 | 6.0 | 6.0 | 6.0 |
| | thermal latent acid catalyst C-2 | 6.0 | — | — | — | — |
| (D) | Compound D-1 | — | — | — | — | 25 |
| titanium dioxide | | 75 | 75 | 75 | 75 | 75 |
| MODAFLOW | | 0.2 | 0.2 | 0.2 | 0.2 | 0.2 |

Note
1) titanium dioxide JR-602®: a product of Teikoku Kako Co., Ltd., titanium dioxide of rutile type
2) MODAFLOW®: a product of Monsanto Co., a leveling agent

Preparation Comparative Examples 3 and 4

Synthesis of enamel coating compositions comprising the epoxy group-containing acrylic resin for precoat metal Titanium dioxide was charged into the resin of Preparation Comparative Example 1 or 2 in a sand mill and dispersed until the particle size was decreased to not more than 10 μ And then, other raw materials were charged and mixed to be in the formulation shown in Table 18, so that the one component type enamel coating composition was prepared.

The obtained coating compositions were controlled with SOLVESSO # 150® (a product of Esso Co., aromatic petroleum naphtha) to be the viscosity of 120±10 seconds by Ford cup No.4.

TABLE 18

| formulation ratio (parts by weight) | | Preparation Comparative Example 3 | Preparation Comparative Example 4 |
|---|---|---|---|
| epoxy group-containing acrylic resin | | Preparation Comparative Example 1 | Preparation Comparative Example 2 |
| | | 100 | 100 |
| (B) | Compound B-1 | 50 | 50 |

TABLE 18-continued

|  | Preparation Comparative Example | |
|---|---|---|
| formulation ratio (parts by weight) | 3 | 4 |
| (C) thermal latent acid catalyst C-1 | 6.0 | — |
| thermal latent acid catalyst C-2 | — | 6.0 |
| titanium dioxide | 75 | 75 |
| MODAFLOW | 0.2 | 0.2 |

Note
1) titanium dioxide JR-602®: a product of Teikoku Kako Co., Ltd., titanium dioxide of rutile type
2) MODAFLOW®: a product of Monsanto Co., a leveling agent Preparation Example 30 to 39
Synthesis of clear coating compositions for precoat metal according to the present invention The raw materials were charged and mixed to be in the formulation shown in Table 19 and 20, so that the one component type coating compositions were prepared.

The obtained coating compositions were controlled with SOLVESSO # 150® (a product of Esso Co., aromatic petroleum naphtha) to be the viscosity of 120±10 seconds by Ford cup No.4.

TABLE 19

| Preparation Example | 30 | 31 | 32 | 33 | 34 |
|---|---|---|---|---|---|
| formulation ratio (parts by weight) | | | | | |
| (A) Compound A-1 | 100 | — | — | — | — |
| Compound A-2 | — | 100 | — | — | — |
| Compound A-3 | — | — | 150 | — | — |
| Compound A-4 | — | — | — | 150 | — |
| Compound A-5 | — | — | — | — | 150 |
| (B) Compound B-1 | 50 | — | 50 | 50 | 50 |
| Compound B-2 | — | 100 | — | — | — |
| (C) thermal latent acid catalyst C-1 | 6.0 | — | 8.0 | — | 8.0 |
| thermal latent acid catalyst C-2 | — | 8.0 | — | 8.0 | — |
| MODAFLOW | 0.2 | 0.2 | 0.2 | 0.2 | 0.2 |

TABLE 20

| Preparation Example | 35 | 36 | 37 | 38 | 39 |
|---|---|---|---|---|---|
| formulation ratio (parts by weight) | | | | | |
| (A) Compound A-6 | 100 | — | — | — | — |
| Compound A-7 | — | 100 | — | — | 100 |
| Compound A-8 | — | — | 100 | — | — |
| Compound A-9 | — | — | — | 100 | — |
| (B) Compound B-1 | 50 | 50 | 50 | 50 | 50 |
| Compound B-2 | — | — | — | — | — |
| (C) thermal latent acid catalyst C-1 | — | 6.0 | 6.0 | 6.0 | 6.0 |
| thermal latent acid catalyst C-2 | 6.0 | — | — | — | — |
| (D) Compound D-1 | — | — | — | — | 25 |
| MODAFLOW | 0.2 | 0.2 | 0.2 | 0.2 | 0.2 |

Note
MODAFLOW®: a product of Monsanto Co., a leveling agent

Preparation Comparative Examples 5 and 6
Synthesis of clear coating compositions comprising the epoxy group-containing acrylic resin for precoat metal The raw materials were charged and mixed to be in the formulation shown in Table 21, so that the one component type coating compositions were prepared.

The obtained coating compositions were controlled with SOLVESSO # 150® (a product of Esso Co., aromatic petroleum naphtha) to be the viscosity of 120±10 seconds by Ford cup No.4.

TABLE 21

|  | Preparation Comparative Example | |
|---|---|---|
| formulation ratio (parts by weight) | 5 | 6 |
| epoxy group-containing acrylic resin | Preparation Comparative Example 1 100 | Preparation Comparative Example 2 100 |
| (B) Compound B-1 | 50 | 50 |
| (C) thermal latent acid catalyst C-1 | 6.0 | — |
| thermal latent acid catalyst C-2 | — | 6.0 |
| MODAFLOW | 0.2 | 0.2 |

Note
MODAFLOW®: a product of Monsanto Co., a leveling agent (2) Preparation of test pieces Examples 21 through 40, Comparative Example 7 through 10, 11 and 12

Under coating compositions, and further intermediate coating compositions in Examples 31 to 35 and 37 to 40 and Comparative Examples 9 and 10, shown in Table 22 and 26 were applied on the steel plates shown in Table 22 to 26 in an amount to form a film having dried thickness shown in Table 22 to 26 by a roll coater and the steel plates were baked in the condition shown in Table 22 to 26.

And then, in Example 21 to 41 the coating compositions of Preparation Examples 20 to 39 comprising the thermosetting composition of the present invention, in Comparative Example 7 to 10 the coating compositions comprising the thermosetting compositions of Preparation Comparative Examples 3 to 6, and in Comparative Examples 11 and 12 the coating composition comprising a conventional high molecular weight polyester for a precoating composition and the polyester coating composition were applied on the coated steel plates in an amount to form a film having dried thickness shown in Table 22 to 26 and baked in the condition shown in Table 22 to 26, as the top coating composition.

In all cases, uniform cured films having good gloss were prepared.

(3) Evaluation of cured film properties

The following tests of cured film properties were conducted about the test pieces of Examples 21 to 40 and Comparative Examples 7 to 12.

(i) Elasticity (1)

Four same plates as a test piece having width of 5cm were put on the reverse side of coated face of a test piece in a method of 4T bending processing. Two same plates as the test piece were put on the reverse side of coated face of a test piece in a method of 2T bending processing. These test pieces were bent at the angle of 180 deg. and attached completely to be the coated face in outside at a roon temperature of 20° C. After the bending test, a pressure sensitive adhesive cellophane tape was adhered on the test piece and peeled off. Evaluation was conducted in accordance with the following standard.

◎: Cured film was not peeled off.
○: Percentage of cured film peeled off was not more than 10%.

Δ: Percentage of cured film peeled off was more than 10% and not more than 50%.

×: Percentage of cured film peeled off was more than 50%.

(ii) Elasticity (2)

Six same plates as a test piece having width of 5 cm were put on the reverse side of coated face of a test piece in a method of 6T bending processing. Four same plates as the test piece were put on the reverse side of coated face of a test piece in a method of 4T bending processing. These test pieces were bent at the angle of 180 deg. and attached completely to be the coated face in outside at a room temperature of 20° C. After the bending test, the tip was observed by a magnifying lens of 10 magnifications. Evaluation was conducted in accordance with the following standard.

⊚: Cracks were not observed at all.

○: Percentage of cracks was not more than 10%.

Δ: Percentage of cracks was more than 10% and not more than 50%.

×: Percentage of cracks was more than 50%.

This test method by the magnifying lens provides a extreme rigorous judgement compared with the test method by the pressure sensitive adhesive cellophane tape of elasticity (1).

(iii) Impact resistance (1)

By using an shock deformation tester (Japanese Industrial Standard K-5400 (1990), 8.3.2 Du Pont method), a test piece was clamped to an impact frame of 6.35 mm radius and a weight of 500 g was dropped from the height of 40 cm on the test piece. Damage made on the cured film was observed by visual comparison.

(iv) Impact resistance (2)

According to the test method of impact resistance (1), a weight of 1000 g was dropped from the height of 40 cm on the test piece. Damage made on the cured film was observed by visual comparison.

This test method of impact resistance (2) provides a extreme rigorous judgement compared with impact resistance (1).

(v) Pencil scratch value

The pencil hardness, which does not generate clouds on the cured film by a pencil scratch test machine, was determined according to Japanese Industrial Standard K-5400 (1990) 8.4.1 (a).

(vi) Salt spray resistance

By using a test piece bent by 4T bending processing, a salt spray test was conducted for 1000 hours according to the method of Japanese Industrial Standard Z-2371 and K-5400 (1990) 9.1. Condition of generation of white rust and blistering on a plane portion, a portion bent by 4T bending processing and a crosscut portion was observed. Evaluation was conducted in accordance with the following standard.

○: Generation of white rust and blistering was not observed.

Δ: Generation of white rust and blistering was slightly observed.

×: Generation of white rust and blistering was apparently observed.

(vii) Boiling water resistance

A test piece was dipped in boiling water for 2 hours, and then abnormality was observed according to the method of Japanese Industrial Standard K-5400 (1990) 8. 20. Evaluation was conducted in accordance with the following standard.

○: Abnormality of a cured film was not observed.

Δ: Generation of blistering was slightly observed.

×: Generation of blistering was apparently observed.

(viii) Weathering resistance

By using a weathering resistance tester of sunshine carbon arc lamp (Japanese Industrial Standard K-5400 (1990) 9.8.1), a test piece was exposed for 1000 hours. The 60 degree specular gloss of the cured film was measured according to Japanese Industrial Standard K-5400 (1990) 7.6 and compared with that of a cured film which was not exposed.

(viv) Acid resistance

On a test piece, 2 ml of 40 weight % sulfuric acid was applied as spots and condition of the cured film was observed by visual comparison after heating for 30 minutes at 60° C.

(x) oil ink stain resistance

On the test piece, a line of oil ink was drawn and the test piece was allowed to stand at room temperature for 48 hours. And the line of oil ink was wiped with a flannel soaked with xylene. The surface condition of the test piece was observed by visual.

(xi) Carbon stain resistance

One ml of dispersion comprising carbon black and water in weight ratio 5:95 was adhered on the surface of a cured film. After allowing to stand as it is for 24 hours at 20° C. in a thermostat, the test piece was washed with water, and then degree of the discoloration of the portion adhered with dispersion was observed by visual comparison.

Evaluation was conducted in accordance with the following standard.

⊚: Trace was not observed.

○: Trace was slightly observed.

Δ: Many traces were observed.

×: Strong trace was apparently observed.

(xii) Storage stability

The clear coating compositions of (1) described above were controlled with SOLVESSO # 150® (a product of Esso Co., aromatic petroleum naphtha) to be the viscosity of 120 seconds by Ford cup No.4. The coating compositions were stored in a sealed condition at 30° C. for 30 days and then the viscosities were measured.

TABLE 22

| Example | | 21 | 22 | 23 | 24 | 25 |
|---|---|---|---|---|---|---|
| steel plate | raw material | GI | GI | GI | GL | GL |
| | chemical treatment | Cr | Cr | P | Cr | Cr |
| under coating condition | coating composition | SP-7 | SP-7 | SP-7 | SP-7 | SP-7 |
| | film thickness (μm) | 5 | 5 | 5 | 5 | 5 |
| | metal temperature × time at baking | 200° C. × 40 sec. | 200° C. × 40 sec. | 200° C. × 40 sec. | 200° C. × 40 sec. | 200° C. × 40 sec. |
| top coating condition | coating composition | Pre. Ex. 20 | Pre. Ex. 21 | Pre. Ex. 22 | Pre. Ex. 23 | Pre. Ex. 24 |
| | film thickness (μm) | 15 | 15 | 15 | 15 | 15 |
| | curing condition: metal temperature × time | 230° C. × 50 sec. | 230° C. × 50 sec. | 230° C. × 50 sec. | 230° C. × 50 sec. | 230° C. × 50 sec. |

TABLE 22-continued

| Example | | 21 | 22 | 23 | 24 | 25 |
|---|---|---|---|---|---|---|
| elasticity (1) | 4T | ◉ | ◉ | ◉ | ◉ | ◉ |
| | 2T | ◉ | ◉ | ◉ | ◉ | ◉ |
| elasticity (2) | 6T | ◉ | ◉ | ◉ | ◉ | ◉ |
| | 4T | ○ | ○ | ○ | ○ | ○ |
| impact resistance (1) | | non abnormal | non abnormal | non abnormal | non abnormal | non abnormal |
| impact resistance (2) | | non abnormal | non abnormal | non abnormal | non abnormal | non abnormal |
| pencil scratch value | | H | H | H | H | H |
| salt spray | plane portion | ○ | ○ | ○ | ○ | ○ |
| resistance | bent portion (4T) | ○ | ○ | ○ | ○ | ○ |
| | crosscut portion with cloud | ○ | ○ | ○ | ○ | ○ |
| boiling water resistance | | ○ | ○ | ○ | ○ | ○ |
| weathering resistance | | 91% | 90% | 92% | 91% | 92% |
| acid resistance | | non abnormal | non abnormal | non abnormal | non abnormal | non abnormal |
| oil ink stain resistance | | non abnormal | non abnormal | non abnormal | non abnormal | non abnormal |
| carbon stain resistance | | ◉ | ◉ | ◉ | ◉ | ◉ |
| storage | initial viscosity (sec.) | 120 | 120 | 120 | 120 | 120 |
| stability | viscosity after 30 days (sec.) | 140 | 132 | 141 | 132 | 140 |

TABLE 23

| Example | | 26 | 27 | 28 | 29 | 30 |
|---|---|---|---|---|---|---|
| steel plate | raw material | GL | GI | GI | GL | GL |
| | chemical treatment | Cr | Cr | P | Cr | Cr |
| under | coating composition | P-40 | SP-7 | SP-7 | SP-7 | SP-7 |
| coating | film thickness (μm) | 5 | 5 | 5 | 5 | 5 |
| condition | metal temperature × time at baking | 230° C. × 40 sec. | 200° C. × 40 sec. | 200° C. × 40 sec. | 200° C. × 40 sec. | 200° C. × 40 sec. |
| top coating | coating composition | Pre. Ex. 25 | Pre. Ex. 26 | Pre. Ex. 27 | Pre. Ex. 28 | Pre. Ex. 29 |
| condition | film thickness (μm) | 15 | 15 | 15 | 15 | 15 |
| | curing condition: metal temperature × time | 230° C. × 50 sec. | 230° C. × 50 sec. | 230° C. × 50 sec. | 230° C. × 50 sec. | 230° C. × 50 sec. |
| elasticity (1) | 4T | ◉ | ◉ | ◉ | ◉ | ◉ |
| | 2T | ◉ | ◉ | ◉ | ◉ | ◉ |
| elasticity (2) | 6T | ◉ | ◉ | ◉ | ◉ | ◉ |
| | 4T | ○ | ○ | ○ | ○ | ○ |
| impact resistance (1) | | non abnormal | non abnormal | non abnormal | non abnormal | non abnormal |
| impact resistance (2) | | non abnormal | non abnormal | non abnormal | non abnormal | non abnormal |
| pencil scratch value | | H | H | H | H | 2H |
| salt spray | plane portion | ○ | ○ | ○ | ○ | ○ |
| resistance | bent portion (4T) | ○ | ○ | ○ | ○ | ○ |
| | crosscut portion with cloud | ○ | ○ | ○ | ○ | ○ |
| boiling water resistance | | ○ | ○ | ○ | ○ | ○ |
| weathering resistance | | 91% | 91% | 90% | 92% | 93% |
| acid resistance | | non abnormal | non abnormal | non abnormal | non abnormal | non abnormal |
| oil ink stain resistance | | non abnormal | non abnormal | non abnormal | non abnormal | non abnormal |
| carbon stain resistance | | ◉ | ◉ | ◉ | ◉ | ◉ |
| storage | initial viscosity (sec.) | 120 | 120 | 120 | 120 | 120 |
| stability | viscosity after 30 days (sec.) | 132 | 132 | 140 | 135 | 145 |

TABLE 24

| Example | | 31 | 32 | 33 | 34 | 35 |
|---|---|---|---|---|---|---|
| steel plate | raw material | GF | GF | GF | GI | GI |
| | chemical treatment | Cr | Cr | Cr | Cr | Cr |
| under | coating composition | SP-7 | SP-7 | SP-7 | SP-7 | P-40 |
| coating | film thickness (μm) | 5 | 5 | 5 | 5 | 5 |
| condition | metal temperature × time at baking | 200° C. × 40 sec. | 200° C. × 40 sec. | 200° C. × 40 sec. | 200° C. × 40 sec. | 230° C. × 40 sec. |
| intermediate | coating composition | P/3800 white | P/3800 white | P/3800 white | P/3800 white | P/3800 white |
| coating | film thickness (μm) | 15 | 15 | 15 | 15 | 15 |
| condition | metal temperature × time at baking | 210° C. × 50 sec. | 210° C. × 50 sec. | 210° C. × 50 sec. | 210° C. × 50 sec. | 210° C. × 50 sec. |

TABLE 24-continued

| Example | | 31 | 32 | 33 | 34 | 35 |
|---|---|---|---|---|---|---|
| top coating condition | coating composition | Pre. Ex. 30 | Pre. Ex. 31 | Pre. Ex. 32 | Pre. Ex. 33 | Pre. Ex. 34 |
| | film thickness (μm) | 10 | 10 | 10 | 10 | 10 |
| | metal temperature × time at baking | 230° C. × 50 sec. | 230° C. × 50 sec. | 230° C. × 50 sec. | 230° C. × 50 sec. | 230° C. × 50 sec. |
| elasticity (1) | 4T | ⊚ | ⊚ | ⊚ | ⊚ | ⊚ |
| | 2T | ⊚ | ⊚ | ⊚ | ⊚ | ⊚ |
| elasticity (2) | 6T | ⊚ | ⊚ | ⊚ | ⊚ | ⊚ |
| | 4T | ○ | ○ | ○ | ○ | ○ |
| impact resistance (1) | | non abnormal | non abnormal | non abnormal | non abnormal | non abnormal |
| impact resistance (2) | | non abnormal | non abnormal | non abnormal | non abnormal | non abnormal |
| pencil hardness | | H | H | H | H | H |
| salt spray resistance | plane portion | ○ | ○ | ○ | ○ | ○ |
| | bent portion (4T) | ○ | ○ | ○ | ○ | ○ |
| | crosscut portion with cloud | ○ | ○ | ○ | ○ | ○ |
| boiling water resistance | | ○ | ○ | ○ | ○ | ○ |
| weathering resistance | | 94% | 95% | 94% | 95% | 94% |
| acid resistance | | non abnormal | non abnormal | non abnormal | non abnormal | non abnormal |
| oil ink stain resistance | | non abnormal | non abnormal | non abnormal | non abnormal | non abnormal |
| carbon stain resistance | | ⊚ | ⊚ | ⊚ | ⊚ | ⊚ |
| storage stability | initial viscosity (sec.) | 120 | 120 | 120 | 120 | 120 |
| | viscosity after 30 days (sec.) | 139 | 132 | 137 | 132 | 139 |

TABLE 25

| Example | | 36 | 37 | 38 | 39 | 40 |
|---|---|---|---|---|---|---|
| steel plate | raw material | GI | GI | GF | GL | GI |
| | chemical treatment | P | Cr | Cr | Cr | P |
| under coating condition | coating composition | P/3800 white | SP-7 | SP-7 | SP-7 | SP-7 |
| | film thickness (μm) | 15 | 5 | 5 | 5 | 5 |
| | metal temperature × time at baking | 210° C. × 50 sec. | 200° C. × 40 sec. | 200° C. × 40 sec. | 200° C. × 40 sec. | 200° C. × 40 sec. |
| intermediate coating condition | coating composition | — | P/3800 white | P/3800 white | P/3800 white | P/3800 white |
| | film thickness (μm) | — | 15 | 15 | 15 | 15 |
| | metal temperature × time at baking | — | 210° C. × 50 sec. | 210° C. × 50 sec. | 210° C. × 50 sec. | 210° C. × 50 sec. |
| top coating condition | coating composition | Pre. Ex. 35 | Pre. Ex. 36 | Pre. Ex. 37 | Pre. Ex. 38 | Pre. Ex. 39 |
| | film thickness (μm) | 10 | 15 | 15 | 15 | 15 |
| | metal temperature × time at baking | 230° C. × 50 sec. | 230° C. × 50 sec. | 230° C. × 50 sec. | 230° C. × 50 sec. | 230° C. × 50 sec. |
| elasticity (1) | 4T | ⊚ | ⊚ | ⊚ | ⊚ | ⊚ |
| | 2T | ⊚ | ⊚ | ⊚ | ⊚ | ⊚ |
| elasticity (2) | 6T | ⊚ | ⊚ | ⊚ | ⊚ | ⊚ |
| | 4T | ○ | ○ | ○ | ○ | ○ |
| impact resistance (1) | | non abnormal | non abnormal | non abnormal | non abnormal | non abnormal |
| impact resistance (2) | | non abnormal | non abnormal | non abnormal | non abnormal | non abnormal |
| pencil hardness | | H | H | H | H | 2H |
| salt spray resistance | plane portion | ○ | ○ | ○ | ○ | ○ |
| | bent portion (4T) | ○ | ○ | ○ | ○ | ○ |
| | crosscut portion with cloud | ○ | ○ | ○ | ○ | ○ |
| boiling water resistance | | ○ | ○ | ○ | ○ | ○ |
| weathering resistance | | 95% | 94% | 95% | 94% | 95% |
| acid resistance | | non abnormal | non abnormal | non abnormal | non abnormal | non abnormal |
| oil ink stain resistance | | non abnormal | non abnormal | non abnormal | non abnormal | non abnormal |
| carbon stain resistance | | ⊚ | ⊚ | ⊚ | ⊚ | ⊚ |
| storage stability | initial viscosity (sec.) | 120 | 120 | 120 | 120 | 120 |
| | viscosity after 30 days (sec.) | 132 | 135 | 130 | 132 | 133 |

TABLE 26

| Comparative Example | | 7 | 8 | 9 | 10 | 11 | 12 |
|---|---|---|---|---|---|---|---|
| steel plate | raw material | GI | GI | GI | GI | GI | GI |
| | chemical treatment | Cr | Cr | Cr | Cr | Cr | Cr |
| under coating condition | coating composition | SP-7 | SP-7 | SP-7 | SP-7 | SP-7 | P-40 |
| | film thickness (μm) | 5 | 5 | 5 | 5 | 5 | 5 |
| | metal temperature × time at baking | 200° C. × 40 sec. | 200° C. × 40 sec. | 200° C. × 40 sec. | 200° C. × 40 sec. | 200° C. × 40 sec. | 230° C. × 40 sec. |

TABLE 26-continued

| Comparative Example | | 7 | 8 | 9 | 10 | 11 | 12 |
|---|---|---|---|---|---|---|---|
| intermediate coating condition | coating composition | — | — | P/3800 white | P/3800 white | — | — |
| | film thickness (μm) | — | — | 15 | 15 | — | — |
| | metal temperature × time at baking | — | — | 210° C. × 50 sec. | 210° C. × 50 sec. | — | — |
| top coating condition | coating composition | Pre. Comp. Ex. 3 | Pre. Comp. Ex. 4 | Pre. Comp. Ex. 5 | Pre. Comp. Ex. 6 | P/3200 white | P/3800 white |
| | film thickness (μm) | 15 | 15 | 10 | 10 | 15 | 15 |
| | metal temperature × time at baking | 230° C. × 50 sec. | 230° C. × 50 sec. | 230° C. × 50 sec. | 230° C. × 50 sec. | 230° C. × 50 sec. | 210° C. × 50 sec. |
| elasticity (1) | 4T | ⊚ | ⊚ | ⊚ | ⊚ | ⊚ | ⊚ |
| | 2T | ○ | ○ | ○ | ○ | ○ | ○ |
| elasticity (2) | 6T | Δ | Δ | Δ | Δ | ⊚ | ○ |
| | 4T | x | x | x | x | ○ | x |
| impact resistance (1) | | non abnormal | non abnormal | non abnormal | non abnormal | non abnormal | non abnormal |
| impact resistance (2) | | crack | crack | crack | crack | non abnormal | a few brief crak |
| pencil hardness | | H | H | H | H | H | H |
| salt spray resistance | plane portion | ○ | ○ | ○ | ○ | ○ | ○ |
| | bent portion (4T) | ○ | ○ | ○ | ○ | ○ | ○ |
| | crosscut portion with cloud | ○ | ○ | ○ | ○ | ○ | ○ |
| boiling water resistance | | ○ | ○ | ○ | ○ | ○ | ○ |
| weathering resistance | | 90% | 88% | 95% | 93% | 64% | 68% |
| acid resistance | | non abnormal | non abnormal | non abnormal | non abnormal | spot trace | spot trace |
| oil ink stain resistance | | non abnormal | non abnormal | non abnormal | non abnormal | spot trace | spot trace |
| carbon stain resistance | | ⊚ | ⊚ | ⊚ | ⊚ | x | x |
| storage stability | initial viscosity (sec.) | 120 | 120 | 120 | 120 | 120 | 120 |
| | viscosity after 30 days (sec.) | 139 | 133 | 139 | 132 | 145 | 150 |

Notes
1) raw materials
GI: hot-dip zinc coated steel plate, plating amount: Z-25, plate thickness: 0.4 mm
GF: hot-dip 5% aluminium-zinc coated steel plate, plating amount Y-25, plate thickness: 0.4 mm
GL: hot dip 55% aluminium-zinc coated steel plate, plating amount: Y-25, plate thickness: 0.4 mm
2) chemical treatments
P: zinc phosphate treatment
Cr: chromating of coating type
3) coating compositions
P-40: PRECOLOR PRIMER P-40®, a product of NOF CORPORATION, high-molecular weight type polyester coating
SP-7: PRECOLOR PRIMER SP-7®, a product of NOF CORPORATION, epoxy resin coating
P/3800: white PRECOLOR 3800 WHITE, a product of NOF CORPORATION, polyester coating
P/3200 white: PRECOLOR 3200 WHITE, a product of NOF CORPORATION, high-molecular weight type polyester coating As shown in Table 22 to 25, the precoat metal coated steel plates in Example 21 to 40 of the present invention have excellent elasticity, impact resistance, pencil hardness, salt spray resistance, boiling water resistance, weathering resistance, acid resistance, oil ink resistance and carbon stain resistance, and the clear coating compositions were excellent in storage stability.

On the other hand, Comparative Examples 7 to 10 in which the epoxy group-containing acrylic resins were used and which are corresponding to Examples of European Patent Publication No. 643,112 were inferior in elasticity (2) and impact resistance (2). Comparative Example 11, in which the conventional high molecular weight polyester coating composition for precoat metal was used, is inferior in weathering resistance, acid resistance, oil ink stain resistance and carbon stain resistance.

Also, Comparative Example 12, in which the conventional polyester coating composition for precoat metal was used, is inferior in elasticity (2), impact resistance (2), weathering resistance, acid resistance, oil ink stain resistance and carbon stain resistance.

The thermosetting composition of the present invention can give cured articles having excellent hardness, chemical resistance, stain resistance, processability, impact resistance, elasticity and weathering resistance. Further, the thermosetting composition is excellent in storage stability.

The curable composition is favorably utilized in the field of coatings, ink, adhesive and molded plastics. Particularly, when it is utilized as a top coating material, it discharges a small amount of organic solvents into air, and gives excellent appearance to the finished articles. The thermosetting composition, the coating method and coated articles of the present invention are advantageously applied to coatings for automobiles and the other industrial coating fields.

We claim:

1. A thermosetting composition which comprises (A) an epoxy group-containing modified polyester polymer comprising a structural moiety of (a) a carboxyl group-containing polyester resin having a number average molecular weight of 1,500 to 50,000 and a resin acid value of 2 to 30 mgKOH/g and a structural moiety of a polymer prepared by polymerizing (b) an epoxy group-containing vinyl monomer, the carboxyl groups and a part of the epoxy groups being bonded in an equivalent ratio of the carboxyl groups in the component (a) to the epoxy groups in the polymer of the component (b) of 0.1 or less, and having an epoxy equivalent weight of 200 to 2,000 g/mol, with at least one other vinyl monomer (c), wherein a weight ratio of the structural moiety of the component (a) to the structural moiety of the polymer of the component (b) and the component (c) in the component (A) is 1/99 to 80/20, and (B) a compound having, per molecule, two or more functional groups of formula (1):

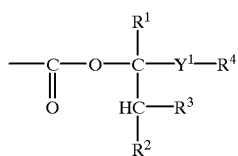

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component.

2. The thermosetting composition as claimed in claim 1, wherein the carboxyl group-containing polyester resin in the component (A) is a linear polyester resin comprising structural units of a dicarboxylic acid and a diol.

3. A thermosetting composition which comprises (A) an epoxy group-containing modified polyester polymer having an epoxy equivalent weight of 200 to 2,000 g/mol prepared by polymerizing (b) an epoxy group-containing vinyl monomer and at least one other vinyl monomer (c) in the presence of (a) a carboxyl group-containing polyester resin having a number average molecular weight of 1,500 to 50,000 and a resin acid value of 2 to 30 mgKOH/g and a solvent in an equivalent ratio of the carboxyl group of the component (a) to the epoxy groups of the component (b) of 0.1 or less with a radical polymerization initiator, wherein a weight ratio of the component (a) to a total weight of the component (b) and the component (c) in component (A) is 1/99 to 80/20, and (B) a compound having, per molecule, two or more functional groups of formula (1):

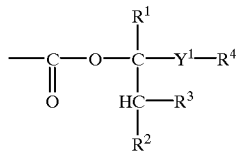

(1)

wherein $R^1$, $R^2$ and $R^3$ are each selected from the group consisting of a hydrogen atom and an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component.

4. The thermosetting composition as claimed in claim 3, which further comprises (C) a thermal latent acid catalyst which is activated during curing the composition, wherein the thermal latent acid catalyst is at least one member selected from the group consisting of a compound prepared by neutralizing a protonic acid or a Lewis acid with a Lewis base, a mixture of a Lewis acid and a trialkylphosphate, an ester of a sulfonic acid, an ester of phosphoric acid, an onium compound, a compound comprising (I) an epoxy group-containing compound, (II) a sulfur atom-containing compound and (III) a Lewis acid and a compound comprising the compound (I), the compound (II) and the compound (III) and (IV) a carboxylic acid and/or a carboxylic anhydride.

5. The thermosetting composition as claimed in claim 4, wherein the compound (B) is a polyester resin.

6. The thermosetting composition as claimed in claim 3, wherein the carboxyl group-containing polyester resin in the component (A) is a linear polyester resin comprising structural units of a dicarboxylic acid and a diol.

7. The thermosetting composition as claimed in claim 1, which further comprises (C) a thermal latent acid catalyst which is activated during curing of the composition, wherein the thermal latent acid catalyst is at least one member selected from the group consisting of a compound prepared by neutralizing a protonic acid or a Lewis acid with a Lewis base, a mixture of a Lewis acid and a trialkylphosphate, an ester of a sulfonic acid, an ester of phosphoric acid, an onium compound, a compound comprising (I) an epoxy group-containing compound, (II) a sulfur atom-containing compound and (III) a Lewis acid and a compound comprising the compound (I), the compound (II) and the compound (III) and (IV) a carboxylic acid and/or a carboxylic anhydride.

8. The thermosetting composition as claimed in claim 5, which further comprises (D) a dispersing component of at least one inorganic oxide sol selected from the group consisting of aluminum oxide sol, silica sol, zirconium oxide sol and antimony oxide sol.

9. The thermosetting composition as claimed in claim 1, wherein the ingredient (B) is a polymer of a vinyl monomer.

10. The thermosetting composition as claimed in claim 1, wherein the compound (B) is a polyester resin.

11. The thermosetting composition as claimed in claim 1, wherein the compound (B) is a thermal latent carboxylic compound produced by reacting a vinyl ether and a polycarboxylic compound prepared by a half esterification of a polyol having two or more hydroxyl groups per a molecule and an acid anhydride.

12. A method of coating which comprises coating a substrate with a top coating composition comprising a pigment and the thermosetting composition as claimed in claim 5, the pigment being in an amount of 0 to 300 parts by weight based on 100 parts by weight of a total nonvolatile matter of the component (A) and the component (B) of the thermosetting composition.

13. A method of coating which comprises coating a substrate with multi-layers by coating the substrate with a colored film-forming composition to form a base coat, followed by coating the base coat with a clear film-forming composition to form a clear top coat, the clear film-forming composition being a top coating composition comprising the thermosetting composition as claimed in claim 5.

14. A method of coating which comprises coating a metal plate with an undercoating composition to form an undercoat layer and curing the resultant undercoat layer, and followed by coating the metal plate which had previously been coated with the undercoating composition, with a top coating composition comprising a pigment and the thermosetting composition claimed in claim 5, the pigment being in an amount of 0 to 300 parts by weight based on 100 parts by weight of a total nonvolatile matter of the component (A) and the component (B) of the thermosetting composition, and then curing the resultant top coat layer by heating.

15. A method of coating which comprises coating a metal plate with an undercoating composition to form an undercoat layer and curing the resultant undercoat layer, coating the metal plate which had previously been coated with the undercoating composition, with an intermediate coating composition and curing the intermediate coat layer, and followed by coating the metal plate with a top coating composition comprising a pigment and the thermosetting composition claimed in claim 5, the pigment being in an amount of 0 to 300 parts by weight based on 100 parts by weight of a total nonvolatile matter of the component (A) and the component (B) of the thermosetting composition, and then curing the top coat layer by heating.

16. The method of coating as claimed in claim 14, wherein the metal plate is selected from the group consisting of a cold rolled steel plate, a zinc coated steel plate, an aluminum-zinc coated steel plate, a stainless steel plate, an aluminum plate and an aluminum alloy plate.

17. A coated article produced by the method of coating claimed in claim 12, 13, 14, 15 or 16.

18. The thermosetting composition as claimed in claim 3, wherein the compound (B) is a polyester resin.

19. The thermosetting composition as claimed in claim 3, wherein the compound (B) is a thermal latent carboxylic compound produced by reacting a vinyl ether and a polycarboxylic compound prepared by a half esterification of a polyol having two or more hydroxyl groups per a molecule and an acid anhydride.

20. The thermosetting composition as claimed in claim 7, wherein the compound (B) is a polyester resin.

21. The thermosetting composition as claimed in claim 7, wherein the compound (B) is a thermal latent carboxylic compound produced by reacting a vinyl ether and a polycarboxylic compound prepared by a half esterification of a polyol having two or more hydroxyl groups per a molecule and an acid anhydride.

22. The thermosetting composition as claimed in claim 4, wherein the compound (B) is a thermal latent carboxylic compound produced by reacting a vinyl ether and a polycarboxylic compound prepared by a half esterification of a polyol having two or more hydroxyl groups per a molecule and an acid anhydride.

23. The thermosetting composition as claimed in claim 22, which further comprises (D) a dispersing component of at least one inorganic oxide sol selected from the group consisting of aluminum oxide sol, silica sol, zirconium oxide sol and antimony oxide sol.

24. A method of coating which comprises coating a substrate with a top coating composition comprising a pigment and the thermosetting composition as claimed in claim 22, the pigment being in an amount of 0 to 300 parts by weight based on 100 parts by weight of a total nonvolatile matter of the component (A) and the component (B) of the thermosetting composition.

25. A method of coating which comprises coating a substrate with multi-layers by coating the substrate with a colored film-forming composition to form a base coat, followed by coating the base coat with a clear film-forming composition to form a clear top coat, the clear film-forming composition being a top coating composition comprising the thermosetting composition as claimed in claim 22.

26. A method of coating which comprises coating a metal plate with an undercoating composition to form an undercoat layer and curing the resultant undercoat layer, and followed by coating the metal plate which had previously been coated with the undercoating composition, with a top coating composition comprising a pigment and the thermosetting composition claimed in claim 22, the pigment being in an amount of 0 to 300 parts by weight based on 100 parts by weight of a total nonvolatile matter of the component (A) and the component (B) of the thermosetting composition, and then curing the resultant top coat layer by heating.

27. A method of coating which comprises coating a metal plate with an undercoating composition to form an undercoat layer and curing the resultant undercoat layer, coating the metal plate which had previously been coated with the undercoating composition, with an intermediate coating composition and curing the intermediate coat layer, and followed by coating the metal plate with a top coating composition comprising a pigment and the thermosetting composition claimed in claim 22, the pigment being in an amount of 0 to 300 parts by weight based on 100 parts by weight of a total nonvolatile mater of the component (A) and the component (B) of the thermosetting composition, and then curing the top coat layer by heating.

28. The method of coating as claimed in claim 15, wherein the metal plate is selected from the group consisting of a cold rolled steel plate, a zinc coated steel plate, an aluminum-zinc coated steel plate, a stainless steel plate, an aluminum plate and an aluminum alloy plate.

* * * * *